US008630617B2

(12) United States Patent
Raleigh

(10) Patent No.: US 8,630,617 B2
(45) Date of Patent: Jan. 14, 2014

(54) DEVICE GROUP PARTITIONS AND SETTLEMENT PLATFORM

(71) Applicant: Headwater Partners I LLC, Redwood City, CA (US)

(72) Inventor: Gregory Raleigh, Redwood City, CA (US)

(73) Assignee: Headwater Partners I LLC, Redwood Shores, CA (US)

( * ) Notice: Subject to any disclaimer, the term of this patent is extended or adjusted under 35 U.S.C. 154(b) by 0 days.

(21) Appl. No.: 13/656,620

(22) Filed: Oct. 19, 2012

(65) Prior Publication Data
US 2013/0065553 A1 Mar. 14, 2013

Related U.S. Application Data

(63) Continuation of application No. 12/694,451, filed on Jan. 27, 2010, which is a continuation-in-part of application No. 12/380,780, filed on Mar. 2, 2009.

(60) Provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/270,353, filed on Jul. 6, 2009, provisional application No. 61/252,153, filed on Oct. 15, 2009.

(51) Int. Cl.
*H04M 11/00* (2006.01)

(52) U.S. Cl.
USPC .......................................... 455/406; 709/223

(58) Field of Classification Search
USPC ............ 705/15, 16, 26.1, 26.2; 709/203, 219, 709/223, 224; 455/405–409, 414.1, 422.1, 455/431, 432.1
See application file for complete search history.

(56) References Cited

U.S. PATENT DOCUMENTS 5,283,904 A 2/1994 Carson et al.
5,577,100 A 11/1996 McGregor et al.
(Continued)

FOREIGN PATENT DOCUMENTS

CN 1538730 A 10/2004
CN 101035308 A 3/2006
(Continued)

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
(Continued)

*Primary Examiner* — Andrew Joseph Rudy
(74) *Attorney, Agent, or Firm* — Krista S. Jacobsen

(57) ABSTRACT

A method performed by a network system communicatively coupled to an end-user device via a wireless network, the method comprising: obtaining usage information associated with the end-user device from one or more sources, the usage information identifying a device activity of the end-user device and including a measure of usage of the wireless network associated with the device activity; using one or more rules and the usage information, generating first information and second information, the first information for use in providing, to a first entity, a first accounting of a first portion of the usage, the first entity being other than a user of the end-user device and other than the operator of the wireless network, the second information for use in, providing, to a second entity, an accounting of a second portion of the usage; and providing the first information and the second information to a network element.

30 Claims, 6 Drawing Sheets

(56) References Cited

U.S. PATENT DOCUMENTS

| | | | |
|---|---|---|---|
| 5,594,777 A | 1/1997 | Makkonen et al. | |
| 5,630,159 A | 5/1997 | Zancho | |
| 5,633,484 A | 5/1997 | Zancho et al. | |
| 5,794,142 A | 8/1998 | Vanttila et al. | |
| 5,814,798 A | 9/1998 | Zancho | |
| 5,889,477 A | 3/1999 | Fastenrath | |
| 5,892,900 A | 4/1999 | Ginter et al. | |
| 5,903,845 A | 5/1999 | Buhrmann et al. | |
| 5,915,008 A | 6/1999 | Dulman | |
| 5,933,778 A | 8/1999 | Buhrmann et al. | |
| 5,940,472 A | 8/1999 | Newman et al. | |
| 5,983,270 A | 11/1999 | Abraham et al. | |
| 6,035,281 A | 3/2000 | Crosskey et al. | |
| 6,038,452 A | 3/2000 | Strawczynski et al. | |
| 6,047,268 A | 4/2000 | Bartoli et al. | |
| 6,064,878 A | 5/2000 | Denker et al. | |
| 6,078,953 A | 6/2000 | Vaid et al. | |
| 6,081,591 A | 6/2000 | Skoog | |
| 6,098,878 A | 8/2000 | Dent et al. | |
| 6,104,700 A | 8/2000 | Haddock et al. | |
| 6,141,686 A | 10/2000 | Jackowski et al. | |
| 6,148,336 A | 11/2000 | Thomas et al. | |
| 6,154,738 A | 11/2000 | Call | |
| 6,198,915 B1 | 3/2001 | McGregor et al. | |
| 6,226,277 B1 | 5/2001 | Chuah | |
| 6,263,055 B1 | 7/2001 | Garland et al. | |
| 6,292,828 B1 | 9/2001 | Williams | |
| 6,317,584 B1 | 11/2001 | Abu-Amara et al. | |
| 6,381,316 B2 | 4/2002 | Joyce et al. | |
| 6,418,147 B1 | 7/2002 | Wiedeman | |
| 6,449,479 B1 | 9/2002 | Sanchez | |
| 6,477,670 B1 | 11/2002 | Ahmadvand | |
| 6,502,131 B1 | 12/2002 | Vaid et al. | |
| 6,505,114 B2 | 1/2003 | Luciani | |
| 6,532,235 B1 | 3/2003 | Benson et al. | |
| 6,532,579 B2 | 3/2003 | Sato et al. | |
| 6,539,082 B1 | 3/2003 | Lowe et al. | |
| 6,542,992 B1 | 4/2003 | Peirce et al. | |
| 6,563,806 B1 | 5/2003 | Yano et al. | |
| 6,574,321 B1 | 6/2003 | Cox et al. | |
| 6,574,465 B2 | 6/2003 | Marsh et al. | |
| 6,581,092 B1 | 6/2003 | Motoyama et al. | |
| 6,598,034 B1 | 7/2003 | Kloth | |
| 6,603,969 B1 | 8/2003 | Vuoristo et al. | |
| 6,606,744 B1 | 8/2003 | Mikurak | |
| 6,631,122 B1 | 10/2003 | Arunachalam et al. | |
| 6,639,975 B1 | 10/2003 | O'Neal et al. | |
| 6,640,097 B2 | 10/2003 | Corrigan et al. | |
| 6,650,887 B2 | 11/2003 | McGregor et al. | |
| 6,651,101 B1 | 11/2003 | Gai et al. | |
| 6,654,814 B1 | 11/2003 | Britton et al. | |
| 6,658,254 B1 | 12/2003 | Purdy et al. | |
| 6,678,516 B2 | 1/2004 | Nordman et al. | |
| 6,683,853 B1 | 1/2004 | Kannas et al. | |
| 6,684,244 B1 | 1/2004 | Goldman et al. | |
| 6,725,031 B2 | 4/2004 | Watler et al. | |
| 6,748,195 B1 | 6/2004 | Phillips | |
| 6,754,470 B2 | 6/2004 | Hendrickson et al. | |
| 6,763,000 B1 | 7/2004 | Walsh | |
| 6,765,864 B1 | 7/2004 | Natarajan et al. | |
| 6,765,925 B1 | 7/2004 | Sawyer et al. | |
| 6,782,412 B2 | 8/2004 | Brophy et al. | |
| 6,785,889 B1 | 8/2004 | Williams | |
| 6,829,596 B1 | 12/2004 | Frazee | |
| 6,829,696 B1 | 12/2004 | Balmer et al. | |
| 6,839,340 B1 | 1/2005 | Voit et al. | |
| 6,873,988 B2 | 3/2005 | Herrmann et al. | |
| 6,876,653 B2 | 4/2005 | Ambe et al. | |
| 6,920,455 B1 | 7/2005 | Weschler | |
| 6,922,562 B2 | 7/2005 | Ward et al. | |
| 6,928,280 B1 | 8/2005 | Xanthos et al. | |
| 6,934,249 B1 | 8/2005 | Bertin et al. | |
| 6,947,723 B1 | 9/2005 | Gurnani et al. | |
| 6,952,428 B1 | 10/2005 | Necka et al. | |
| 6,957,067 B1 | 10/2005 | Iyer et al. | |
| 6,965,667 B2 | 11/2005 | Trabandt et al. | |
| 6,965,872 B1 | 11/2005 | Grdina | |
| 6,967,958 B2 | 11/2005 | Ono et al. | |
| 6,996,076 B1 | 2/2006 | Forbes et al. | |
| 6,996,393 B2 | 2/2006 | Pyhalammi et al. | |
| 6,998,985 B2 | 2/2006 | Reisman et al. | |
| 7,002,920 B1 | 2/2006 | Ayyagari et al. | |
| 7,013,469 B2 | 3/2006 | Smith et al. | |
| 7,024,200 B2 | 4/2006 | McKenna et al. | |
| 7,027,408 B2 | 4/2006 | Nabkel et al. | |
| 7,032,072 B1 | 4/2006 | Quinn et al. | |
| 7,039,037 B2 | 5/2006 | Wang et al. | |
| 7,039,403 B2 | 5/2006 | Wong | |
| 7,039,713 B1 | 5/2006 | Van Gunter et al. | |
| 7,042,988 B2 | 5/2006 | Juitt et al. | |
| 7,043,226 B2 | 5/2006 | Yamauchi | |
| 7,043,268 B2 | 5/2006 | Yukie et al. | |
| 7,058,968 B2 | 6/2006 | Rowland et al. | |
| 7,068,600 B2 | 6/2006 | Cain | |
| 7,069,248 B2 | 6/2006 | Huber | |
| 7,092,696 B1 | 8/2006 | Hosain et al. | |
| 7,102,620 B2 * | 9/2006 | Harries et al. | 345/169 |
| 7,113,780 B2 | 9/2006 | McKenna et al. | |
| 7,113,997 B2 | 9/2006 | Jayapalan et al. | |
| 7,139,569 B2 * | 11/2006 | Kato | 455/432.3 |
| 7,142,876 B2 | 11/2006 | Trossen et al. | |
| 7,158,792 B1 | 1/2007 | Cook et al. | |
| 7,167,078 B2 | 1/2007 | Pourchot | |
| 7,174,174 B2 | 2/2007 | Boris et al. | |
| 7,180,855 B1 | 2/2007 | Lin | |
| 7,181,017 B1 | 2/2007 | Nagel et al. | |
| 7,197,321 B2 | 3/2007 | Erskine et al. | |
| 7,203,169 B1 | 4/2007 | Okholm et al. | |
| 7,212,491 B2 | 5/2007 | Koga | |
| 7,228,354 B2 | 6/2007 | Chambliss et al. | |
| 7,236,780 B2 | 6/2007 | Benco et al. | |
| 7,242,920 B2 | 7/2007 | Morris | |
| 7,245,901 B2 | 7/2007 | McGregor et al. | |
| 7,251,218 B2 | 7/2007 | Jorgensen | |
| 7,280,816 B2 | 10/2007 | Fratti et al. | |
| 7,280,818 B2 | 10/2007 | Clayton | |
| 7,283,561 B1 | 10/2007 | Picher-Dempsey | |
| 7,283,963 B1 | 10/2007 | Fitzpatrick et al. | |
| 7,286,834 B2 | 10/2007 | Walter | |
| 7,286,848 B2 | 10/2007 | Vireday et al. | |
| 7,289,489 B1 | 10/2007 | Kung et al. | |
| 7,290,283 B2 | 10/2007 | Copeland, III | |
| 7,310,424 B2 | 12/2007 | Gehring et al. | |
| 7,313,237 B2 | 12/2007 | Bahl et al. | |
| 7,317,699 B2 | 1/2008 | Godfrey et al. | |
| 7,322,044 B2 | 1/2008 | Hrastar | |
| 7,324,447 B1 | 1/2008 | Morford | |
| 7,325,037 B2 | 1/2008 | Lawson | |
| 7,336,960 B2 | 2/2008 | Zavalkovsky et al. | |
| 7,346,410 B2 | 3/2008 | Uchiyama | |
| 7,349,695 B2 | 3/2008 | Oommen et al. | |
| 7,353,533 B2 | 4/2008 | Wright et al. | |
| 7,356,011 B1 | 4/2008 | Waters et al. | |
| 7,356,337 B2 | 4/2008 | Florence | |
| 7,366,497 B2 | 4/2008 | Nagata | |
| 7,373,136 B2 | 5/2008 | Watler et al. | |
| 7,373,179 B2 | 5/2008 | Stine et al. | |
| 7,388,950 B2 | 6/2008 | Elsey et al. | |
| 7,401,338 B1 | 7/2008 | Bowen et al. | |
| 7,403,763 B2 | 7/2008 | Maes | |
| 7,418,253 B2 | 8/2008 | Kavanah | |
| 7,418,257 B2 | 8/2008 | Kim | |
| 7,421,004 B2 | 9/2008 | Feher | |
| 7,444,669 B1 | 10/2008 | Bahl et al. | |
| 7,450,591 B2 | 11/2008 | Korling et al. | |
| 7,450,927 B1 | 11/2008 | Creswell et al. | |
| 7,457,265 B2 | 11/2008 | Julka et al. | |
| 7,460,837 B2 | 12/2008 | Diener | |
| 7,472,189 B2 | 12/2008 | Mallya et al. | |
| 7,478,420 B2 * | 1/2009 | Wright et al. | 726/1 |
| 7,486,185 B2 | 2/2009 | Culpepper et al. | |
| 7,493,659 B1 | 2/2009 | Wu et al. | |
| 7,496,652 B2 | 2/2009 | Pezzutti | |
| 7,499,438 B2 | 3/2009 | Hinman et al. | |

(56) References Cited

U.S. PATENT DOCUMENTS

| | | |
|---|---|---|
| 7,499,537 B2 | 3/2009 | Elsey et al. |
| 7,502,672 B1 * | 3/2009 | Kolls ........................ 701/31.6 |
| 7,515,608 B2 | 4/2009 | Yuan et al. |
| 7,516,219 B2 | 4/2009 | Moghaddam et al. |
| 7,529,204 B2 * | 5/2009 | Bourlas et al. ................ 370/328 |
| 7,535,880 B1 | 5/2009 | Hinman et al. |
| 7,540,408 B2 * | 6/2009 | Levine et al. ................ 235/379 |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,555,757 B2 | 6/2009 | Smith et al. |
| 7,565,141 B2 | 7/2009 | Macaluso |
| 7,574,509 B2 | 8/2009 | Nixon et al. |
| 7,574,731 B2 | 8/2009 | Fascenda |
| 7,580,356 B1 | 8/2009 | Mishra et al. |
| 7,580,857 B2 | 8/2009 | VanFleet et al. |
| 7,583,964 B2 | 9/2009 | Wong |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,610,396 B2 | 10/2009 | Taglienti et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,633,438 B2 | 12/2009 | Tysowski |
| 7,634,388 B2 | 12/2009 | Archer et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,668,176 B2 | 2/2010 | Chuah |
| 7,668,903 B2 | 2/2010 | Edwards et al. |
| 7,685,131 B2 | 3/2010 | Batra et al. |
| 7,685,254 B2 | 3/2010 | Pandya |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,720,505 B2 | 5/2010 | Gopi et al. |
| 7,720,960 B2 | 5/2010 | Pruss et al. |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,534 B2 | 7/2010 | Anupam et al. |
| 7,756,757 B1 * | 7/2010 | Oakes, III .................... 705/26.1 |
| 7,760,711 B1 | 7/2010 | Kung et al. |
| 7,760,861 B1 | 7/2010 | Croak et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,538 B2 | 9/2010 | Kozisek |
| 7,792,708 B2 | 9/2010 | Alva |
| 7,797,204 B2 | 9/2010 | Balent |
| 7,797,401 B2 | 9/2010 | Stewart et al. |
| 7,801,523 B1 | 9/2010 | Kenderov |
| 7,801,985 B1 | 9/2010 | Pitkow et al. |
| 7,802,724 B1 | 9/2010 | Nohr |
| 7,822,837 B1 | 10/2010 | Urban et al. |
| 7,826,427 B2 | 11/2010 | Sood et al. |
| 7,826,607 B1 | 11/2010 | De Carvalho Resende et al. |
| 7,844,728 B2 | 11/2010 | Anderson et al. |
| 7,848,768 B2 | 12/2010 | Omori et al. |
| 7,856,226 B2 | 12/2010 | Wong et al. |
| 7,865,182 B2 | 1/2011 | Macaluso |
| 7,868,778 B2 | 1/2011 | Kenwright |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,890,084 B1 | 2/2011 | Dudziak et al. |
| 7,890,111 B2 | 2/2011 | Bugenhagen |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,929,959 B2 | 4/2011 | De Atley et al. |
| 7,929,960 B2 | 4/2011 | Martin et al. |
| 7,929,973 B2 | 4/2011 | Zavalkovsky et al. |
| 7,930,446 B2 * | 4/2011 | Kesselman et al. ............. 710/30 |
| 7,937,069 B2 | 5/2011 | Rassam |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 * | 6/2011 | Bobich et al. ................... 705/35 |
| 7,962,622 B2 | 6/2011 | Friend et al. |
| 7,965,983 B1 | 6/2011 | Swan et al. |
| 7,969,950 B2 | 6/2011 | Iyer et al. |
| 7,970,350 B2 | 6/2011 | Sheynman et al. |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,510 B2 | 7/2011 | Kocher et al. |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,988 B2 | 8/2011 | Maes |
| 8,010,080 B1 | 8/2011 | Thenthiruperai et al. |
| 8,010,081 B1 | 8/2011 | Roskowski |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,409 B1 * | 10/2011 | Mikurak .................... 705/14.39 |
| 8,032,899 B2 | 10/2011 | Archer et al. |
| 8,036,600 B2 | 10/2011 | Garrett et al. |

(56) References Cited

U.S. PATENT DOCUMENTS

| | | | |
|---|---|---|---|
| 8,045,973 B2 * | 10/2011 | Chambers | 455/422.1 |
| 8,050,275 B1 | 11/2011 | Iyer | |
| 8,059,530 B1 | 11/2011 | Cole | |
| 8,060,463 B1 | 11/2011 | Spiegel | |
| 8,064,896 B2 | 11/2011 | Bell et al. | |
| 8,068,824 B2 | 11/2011 | Shan et al. | |
| 8,068,829 B2 * | 11/2011 | Lemond et al. | 455/431 |
| 8,073,721 B1 | 12/2011 | Lewis | |
| 8,078,140 B2 | 12/2011 | Baker et al. | |
| 8,078,163 B2 * | 12/2011 | Lemond et al. | 455/431 |
| 8,086,497 B1 * | 12/2011 | Oakes, III | 705/26.1 |
| 8,090,359 B2 | 1/2012 | Proctor, Jr. et al. | |
| 8,090,616 B2 | 1/2012 | Proctor, Jr. et al. | |
| 8,094,551 B2 | 1/2012 | Huber et al. | |
| 8,095,112 B2 | 1/2012 | Chow et al. | |
| 8,095,666 B2 | 1/2012 | Schmidt et al. | |
| 8,098,579 B2 | 1/2012 | Ray et al. | |
| 8,099,077 B2 | 1/2012 | Chowdhury et al. | |
| 8,099,517 B2 | 1/2012 | Jia et al. | |
| 8,102,814 B2 | 1/2012 | Rahman et al. | |
| 8,108,520 B2 | 1/2012 | Ruutu et al. | |
| 8,116,223 B2 | 2/2012 | Tian et al. | |
| 8,116,749 B2 | 2/2012 | Proctor, Jr. et al. | |
| 8,116,781 B2 * | 2/2012 | Chen et al. | 455/452.2 |
| 8,122,128 B2 | 2/2012 | Burke, II et al. | |
| 8,122,249 B2 | 2/2012 | Falk et al. | |
| 8,126,123 B2 | 2/2012 | Cai et al. | |
| 8,126,396 B2 * | 2/2012 | Bennett | 455/41.2 |
| 8,126,476 B2 | 2/2012 | Vardi et al. | |
| 8,126,722 B2 | 2/2012 | Robb et al. | |
| 8,130,793 B2 | 3/2012 | Edwards et al. | |
| 8,131,256 B2 | 3/2012 | Martti et al. | |
| 8,134,954 B2 | 3/2012 | Godfrey et al. | |
| 8,135,388 B1 | 3/2012 | Gailloux et al. | |
| 8,135,392 B2 | 3/2012 | Marcellino et al. | |
| 8,135,657 B2 | 3/2012 | Kapoor et al. | |
| 8,144,591 B2 | 3/2012 | Ghai et al. | |
| 8,149,823 B2 | 4/2012 | Turcan et al. | |
| 8,150,431 B2 | 4/2012 | Wolovitz et al. | |
| 8,155,155 B1 | 4/2012 | Chow et al. | |
| 8,155,620 B2 | 4/2012 | Wang et al. | |
| 8,155,670 B2 | 4/2012 | Fullam et al. | |
| 8,156,206 B2 | 4/2012 | Kiley et al. | |
| 8,160,015 B2 | 4/2012 | Rashid et al. | |
| 8,165,576 B2 | 4/2012 | Raju et al. | |
| 8,166,040 B2 * | 4/2012 | Brindisi et al. | 707/741 |
| 8,166,554 B2 | 4/2012 | Pramod | |
| 8,170,553 B2 | 5/2012 | Bennett | |
| 8,174,970 B2 | 5/2012 | Adamczyk et al. | |
| 8,184,530 B1 | 5/2012 | Swan et al. | |
| 8,184,590 B2 | 5/2012 | Rosenblatt | |
| 8,185,088 B2 | 5/2012 | Klein et al. | |
| 8,185,093 B2 | 5/2012 | Jheng et al. | |
| 8,185,127 B1 | 5/2012 | Cai et al. | |
| 8,185,152 B1 | 5/2012 | Goldner | |
| 8,185,158 B2 | 5/2012 | Tamura et al. | |
| 8,190,675 B2 | 5/2012 | Tribbett | |
| 8,191,116 B1 | 5/2012 | Gazzard | |
| 8,194,549 B2 | 6/2012 | Huber et al. | |
| 8,194,553 B2 | 6/2012 | Liang et al. | |
| 8,194,572 B2 | 6/2012 | Horvath et al. | |
| 8,195,093 B2 | 6/2012 | Garrett et al. | |
| 8,195,163 B2 | 6/2012 | Gisby et al. | |
| 8,196,199 B2 | 6/2012 | Hrastar et al. | |
| 8,200,509 B2 | 6/2012 | Kenedy et al. | |
| 8,200,775 B2 | 6/2012 | Moore | |
| 8,204,190 B2 | 6/2012 | Bang et al. | |
| 8,204,505 B2 | 6/2012 | Jin et al. | |
| 8,208,919 B2 | 6/2012 | Kotecha | |
| 8,213,296 B2 | 7/2012 | Shannon et al. | |
| 8,213,363 B2 | 7/2012 | Ying et al. | |
| 8,214,536 B2 | 7/2012 | Zhao | |
| 8,224,382 B2 | 7/2012 | Bultman | |
| 8,224,773 B2 | 7/2012 | Spiegel | |
| 8,228,818 B2 | 7/2012 | Chase et al. | |
| 8,233,883 B2 | 7/2012 | De Froment | |
| 8,233,895 B2 | 7/2012 | Tysowski | |
| 8,238,287 B1 | 8/2012 | Gopi et al. | |
| 8,239,520 B2 | 8/2012 | Grah | |
| 8,242,959 B2 | 8/2012 | Mia et al. | |
| 8,244,241 B2 | 8/2012 | Montemurro | |
| 8,254,915 B2 | 8/2012 | Kozisek | |
| 8,255,515 B1 | 8/2012 | Melman et al. | |
| 8,255,534 B2 | 8/2012 | Assadzadeh | |
| 8,255,689 B2 | 8/2012 | Kim et al. | |
| 8,265,004 B2 | 9/2012 | Toutonghi | |
| 8,266,681 B2 | 9/2012 | Deshpande et al. | |
| 8,270,972 B2 | 9/2012 | Otting et al. | |
| 8,271,045 B2 | 9/2012 | Parolkar et al. | |
| 8,271,049 B2 | 9/2012 | Silver et al. | |
| 8,271,992 B2 | 9/2012 | Chatley et al. | |
| 8,279,067 B2 | 10/2012 | Berger et al. | |
| 8,279,864 B2 | 10/2012 | Wood | |
| 8,280,354 B2 | 10/2012 | Smith et al. | |
| 8,284,740 B2 | 10/2012 | O'Connor | |
| 8,285,249 B2 | 10/2012 | Baker et al. | |
| 8,291,238 B2 | 10/2012 | Ginter et al. | |
| 8,296,404 B2 | 10/2012 | McDysan et al. | |
| 8,306,518 B1 | 11/2012 | Gailloux | |
| 8,307,067 B2 | 11/2012 | Ryan | |
| 8,315,594 B1 | 11/2012 | Mauser et al. | |
| 8,315,718 B2 | 11/2012 | Caffrey et al. | |
| 8,315,999 B2 | 11/2012 | Chatley et al. | |
| 8,320,244 B2 | 11/2012 | Muqattash et al. | |
| 8,320,949 B2 | 11/2012 | Matta | |
| 8,325,638 B2 | 12/2012 | Jin et al. | |
| 8,326,319 B2 | 12/2012 | Davis | |
| 8,331,293 B2 | 12/2012 | Sood | |
| 8,332,375 B2 | 12/2012 | Chatley et al. | |
| 8,340,718 B2 | 12/2012 | Colonna et al. | |
| 8,347,362 B2 | 1/2013 | Cai et al. | |
| 8,350,700 B2 | 1/2013 | Fast et al. | |
| 8,351,592 B2 | 1/2013 | Freeny, Jr. et al. | |
| 8,351,898 B2 * | 1/2013 | Raleigh | 455/405 |
| 8,352,360 B2 * | 1/2013 | De Judicibus et al. | 705/39 |
| 8,352,980 B2 | 1/2013 | Howcroft | |
| 8,353,001 B2 | 1/2013 | Herrod | |
| 8,356,336 B2 | 1/2013 | Johnston et al. | |
| 8,358,638 B2 | 1/2013 | Scherzer et al. | |
| 8,363,658 B1 | 1/2013 | Delker et al. | |
| 8,364,089 B2 | 1/2013 | Phillips | |
| 8,364,806 B2 | 1/2013 | Short et al. | |
| 8,369,274 B2 | 2/2013 | Sawai | |
| 8,370,477 B2 | 2/2013 | Short et al. | |
| 8,374,090 B2 | 2/2013 | Morrill et al. | |
| 8,374,592 B2 | 2/2013 | Proctor, Jr. et al. | |
| 8,385,896 B2 | 2/2013 | Proctor, Jr. et al. | |
| 8,385,975 B2 | 2/2013 | Forutanpour et al. | |
| 8,386,386 B1 | 2/2013 | Zhu | |
| 8,391,262 B2 | 3/2013 | Maki et al. | |
| 8,396,929 B2 | 3/2013 | Helfman et al. | |
| 8,402,540 B2 | 3/2013 | Kapoor et al. | |
| 8,406,427 B2 | 3/2013 | Chand et al. | |
| 8,411,587 B2 | 4/2013 | Curtis et al. | |
| 8,411,691 B2 | 4/2013 | Aggarwal | |
| 8,422,988 B1 | 4/2013 | Keshav | |
| 8,423,016 B2 | 4/2013 | Buckley et al. | |
| 8,429,403 B2 | 4/2013 | Moret et al. | |
| 8,437,734 B2 | 5/2013 | Ray et al. | |
| 8,447,324 B2 | 5/2013 | Shuman et al. | |
| 8,447,607 B2 | 5/2013 | Weider et al. | |
| 8,447,980 B2 | 5/2013 | Godfrey et al. | |
| 8,452,858 B2 | 5/2013 | Wu et al. | |
| 8,461,958 B2 | 6/2013 | Saenz et al. | |
| 8,463,232 B2 * | 6/2013 | Tuli et al. | 455/405 |
| 8,468,337 B2 | 6/2013 | Gaur et al. | |
| 8,472,371 B1 | 6/2013 | Bari et al. | |
| 8,477,778 B2 | 7/2013 | Lehmann, Jr. et al. | |
| 8,483,135 B2 | 7/2013 | Cai et al. | |
| 8,483,694 B2 | 7/2013 | Lewis et al. | |
| 8,484,327 B2 | 7/2013 | Werner et al. | |
| 8,489,720 B1 | 7/2013 | Morford et al. | |
| 8,495,227 B2 | 7/2013 | Kaminsky et al. | |
| 8,495,360 B2 | 7/2013 | Falk et al. | |

(56) References Cited

U.S. PATENT DOCUMENTS

| | | |
|---|---|---|
| 8,504,729 B2 | 8/2013 | Pezzutti |
| 8,509,082 B2 | 8/2013 | Heinz et al. |
| 8,516,552 B2 | 8/2013 | Raleigh |
| 8,520,589 B2 | 8/2013 | Bhatt et al. |
| 8,521,110 B2 | 8/2013 | Rofougaran |
| 8,522,039 B2 | 8/2013 | Hyndman et al. |
| 8,526,329 B2 | 9/2013 | Mahany et al. |
| 8,526,350 B2 | 9/2013 | Xue et al. |
| 8,543,265 B2 | 9/2013 | Ekhaguere et al. |
| 8,544,105 B2 | 9/2013 | Mclean et al. |
| 8,561,138 B2 | 10/2013 | Rothman et al. |
| 8,571,474 B2 | 10/2013 | Chavez et al. |
| 8,571,993 B2 | 10/2013 | Kocher et al. |
| 8,583,499 B2 * | 11/2013 | De Judicibus et al. .......... 705/21 |
| 2001/0048738 A1 | 12/2001 | Baniak et al. |
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0116338 A1 | 8/2002 | Gonthier et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0088671 A1 | 5/2003 | Klinker et al. |
| 2003/0133408 A1 | 7/2003 | Cheng et al. |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0168052 A1 | 8/2004 | Clisham et al. |
| 2004/0198331 A1 | 10/2004 | Coward et al. |
| 2004/0203755 A1 | 10/2004 | Brunet et al. |
| 2004/0236547 A1 | 11/2004 | Rappaport et al. |
| 2004/0249918 A1 | 12/2004 | Sunshine |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0060266 A1 | 3/2005 | DeMello et al. |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0166043 A1 | 7/2005 | Zhang et al. |
| 2005/0183143 A1 | 8/2005 | Anderholm et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0246282 A1 | 11/2005 | Naslund et al. |
| 2005/0250508 A1 | 11/2005 | Guo et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0034256 A1 | 2/2006 | Addagatla et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072646 A1 | 4/2006 | Feher |
| 2006/0085543 A1 | 4/2006 | Hrastar et al. |
| 2006/0112016 A1 | 5/2006 | Ishibashi |
| 2006/0135144 A1 | 6/2006 | Jothipragasam |
| 2006/0143098 A1 | 6/2006 | Lazaridis |
| 2006/0165060 A1 | 7/2006 | Dua |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0183462 A1 | 8/2006 | Kolehmainen |
| 2006/0190314 A1 | 8/2006 | Hernandez |
| 2006/0199608 A1 | 9/2006 | Dunn et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0291477 A1 | 12/2006 | Croak et al. |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0061243 A1 | 3/2007 | Ramer et al. |
| 2007/0061878 A1 | 3/2007 | Hagiu et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0147324 A1 | 6/2007 | McGary |
| 2007/0155365 A1 | 7/2007 | Kim et al. |
| 2007/0168499 A1 | 7/2007 | Chu |
| 2007/0198656 A1 | 8/2007 | Mazzaferri et al. |
| 2007/0220251 A1 | 9/2007 | Rosenberg et al. |
| 2007/0226225 A1 | 9/2007 | Yiu et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259673 A1 | 11/2007 | Willars et al. |
| 2007/0263558 A1 | 11/2007 | Salomone |
| 2007/0274327 A1 | 11/2007 | Kaarela et al. |
| 2007/0280453 A1 | 12/2007 | Kelley et al. |
| 2007/0282896 A1 | 12/2007 | Wydroug et al. |
| 2007/0294395 A1 | 12/2007 | Strub et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010452 A1 | 1/2008 | Holtzman et al. |
| 2008/0022354 A1 | 1/2008 | Grewal et al. |
| 2008/0039102 A1 | 2/2008 | Sewall et al. |
| 2008/0049630 A1 | 2/2008 | Kozisek et al. |
| 2008/0051076 A1 | 2/2008 | O'Shaughnessy et al. |

(56) References Cited

U.S. PATENT DOCUMENTS

| | | |
|---|---|---|
| 2008/0052387 A1 | 2/2008 | Heinz et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0262798 A1 | 10/2008 | Kim et al. |
| 2008/0268813 A1 | 10/2008 | Maes |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0046723 A1 | 2/2009 | Rahman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0172077 A1 | 7/2009 | Roxburgh et al. |
| 2009/0180391 A1 | 7/2009 | Petersen et al. |
| 2009/0197585 A1 | 8/2009 | Aaron |
| 2009/0219170 A1 | 9/2009 | Clark et al. |
| 2009/0248883 A1 | 10/2009 | Suryanarayana et al. |
| 2009/0257379 A1 | 10/2009 | Robinson et al. |
| 2009/0271514 A1 | 10/2009 | Thomas et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0131584 A1 | 5/2010 | Johnson |
| 2010/0144310 A1 | 6/2010 | Bedingfield |
| 2010/0153781 A1 | 6/2010 | Hanna |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0241544 A1 | 9/2010 | Benson et al. |
| 2010/0325420 A1 | 12/2010 | Kanekar |
| 2011/0013569 A1 | 1/2011 | Scherzer et al. |
| 2011/0081881 A1 | 4/2011 | Baker et al. |
| 2011/0082790 A1 | 4/2011 | Baker et al. |
| 2011/0126141 A1 | 5/2011 | King et al. |
| 2011/0159818 A1 | 6/2011 | Scherzer et al. |
| 2011/0173678 A1 | 7/2011 | Kaippallimalil et al. |
| 2011/0264923 A1 | 10/2011 | Kocher et al. |
| 2012/0020296 A1 | 1/2012 | Scherzer et al. |
| 2012/0196644 A1 | 8/2012 | Scherzer et al. |
| 2012/0238287 A1 | 9/2012 | Scherzer |
| 2013/0029653 A1 | 1/2013 | Baker et al. |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0144789 A1 | 6/2013 | Aaltonen et al. |

FOREIGN PATENT DOCUMENTS

| | | |
|---|---|---|
| CN | 1802839 A | 7/2006 |
| CN | 1889777 A | 7/2006 |
| CN | 101155343 A | 9/2006 |
| CN | 101115248 A | 1/2008 |
| CN | 101341764 A | 1/2009 |
| EP | 1463238 | 9/2004 |
| EP | 1739518 | 1/2007 |
| EP | 1772988 | 4/2007 |
| EP | 1978772 | 10/2008 |
| WO | 9858505 | 12/1998 |
| WO | 9965185 | 12/1999 |
| WO | 03014891 | 2/2003 |
| WO | 03058880 | 7/2003 |
| WO | 2004028070 | 4/2004 |
| WO | 2004064306 | 7/2004 |
| WO | 2004077797 | 9/2004 |
| WO | 2004095753 | 11/2004 |
| WO | 2005008995 | 1/2005 |
| WO | 2006004467 | 1/2006 |
| WO | 2006050758 | 5/2006 |
| WO | 2006073837 | 7/2006 |

(56) References Cited

FOREIGN PATENT DOCUMENTS

| WO | 2006077481 | | 7/2006 |
|---|---|---|---|
| WO | 2006120558 | A1 | 11/2006 |
| WO | 2006130960 | | 12/2006 |
| WO | 2007001833 | | 1/2007 |
| WO | 2007014630 | | 2/2007 |
| WO | 2007018363 | | 2/2007 |
| WO | 2007053848 | | 5/2007 |
| WO | 2007068288 | | 6/2007 |
| WO | 2007069245 | | 6/2007 |
| WO | 2007097786 | A | 8/2007 |
| WO | 2007107701 | | 9/2007 |
| WO | 2007124279 | | 11/2007 |
| WO | 2008017837 | | 2/2008 |
| WO | 2008051379 | | 5/2008 |
| WO | 2008066419 | | 6/2008 |
| WO | 2008080139 | | 7/2008 |
| WO | 2008080430 | | 7/2008 |
| WO | 2008099802 | | 8/2008 |
| WO | 2010088413 | | 8/2010 |

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Dikaiakos et al., "A Distributed Middleware Infrastructure for Personalized Services," Nov. 24, 2003.
European Commission, "Data Roaming Tariffs—Transparency Measures," [online] retrieved from http://web.archive.org/web/20081220232754/http://ec.europa.eu/information_society/activities/roaming/data/measures/index_en.htm, Dec. 20, 2008 [retrieved May 16, 2012].
Farooq et al., "An IEEE 802.16 WiMax Module for the NS-3 Simulator," Mar. 2-6, 2009.
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Knight et al., "Layer 2 and 3 Virtual Private Networks: Taxonomy, Technology, and Standarization Efforts," IEEE Communications Magazine, Jun. 2004.
Koutsopoulou et al., "Middleware Platform for the Support of Charging Reconfiguration Actions," 2005.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Nilsson et al., "A Novel MAC Scheme for Solving the QoS Parameter Adjustment Problem in IEEE802.11e EDCA," Feb. 2006.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Steglich, Stephan, "I-Centric User Interaction," Nov. 21, 2003.
Van Eijk, et al., "GigaMobile, Agent Technology for Designing Personalized Mobile Service Brokerage," Jul. 1, 2002.
Zhu et al., "A Survey of Quality of Service in IEEE 802.11 Networks," IEEE Wireless Communications, Aug. 2004.
European Search Report and Opinion mailed Jul. 25, 2012; 10736344.2-1246/2392090; PCT/US2010022238.
Feb. 11, 2013 Response to Office Action in European Patent Application No. 10736344.2.
Accuris Networks, "The Business Value of Mobile Data Offload—a White Paper", 2010.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Ruckus Wireless—White Paper; "Smarter Wi-Fi for Mobile Operator Infrastructures" 2010.
Wireless Broadband Alliance, "WISPr 2.0, Apr. 8, 2010"; Doc. Ref. No. WBA/RM/WISPr, Version 01.00.
Sep. 3, 2013 Office Action in Chinese Patent Application No. 201080012016.4.
"The Construction of Intelligent Residential District in Use of Cable Television Network," Shandong Science, vol. 13, No. 2, Jun. 2000.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.

\* cited by examiner

DEVICE GROUP PARTITIONS AND SETTLEMENT PLATFORM

CROSS REFERENCE TO OTHER APPLICATIONS

This application is a continuation of U.S. patent application Ser. No. 12/694,451 entitled "Device Group Partitions and Settlement Platform" filed on Jan. 27, 2010, which claims priority to U.S. Provisional Patent Application No. 61/252,153 entitled "Device Group Partitions and Settlement Platform" filed on Oct. 15, 2009, and U.S. Provisional Patent Application No. 61/270,353 entitled "Device Assisted CDR Creation, Aggregation, Mediation and Billing" filed on Jul. 6, 2009. U.S. patent application Ser. No. 12/694,451 is a continuation-in-part of U.S. patent application Ser. No. 12/380,780, entitled "Automated Device Provisioning and Activation," filed on Mar. 2, 2009, which in turn claims priority to:

U.S. Provisional Patent Application No. 61/206,354 entitled "Services Policy Communication System and Method" filed Jan. 28, 2009, U.S. Provisional Patent Application No. 61/206,944 entitled "Services Policy Communication System and Method" filed Feb. 4, 2009, U.S. Provisional Patent Application No. 61/207,393 entitled "Services Policy Communication System and Method" filed Feb. 10, 2009, and U.S. Provisional Patent Application No. 61/207,739 entitled "Services Policy Communication System and Method" filed on Feb. 13, 2009.

Each of the applications cited above is incorporated herein by reference for all purposes.

BACKGROUND OF THE INVENTION

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1A:
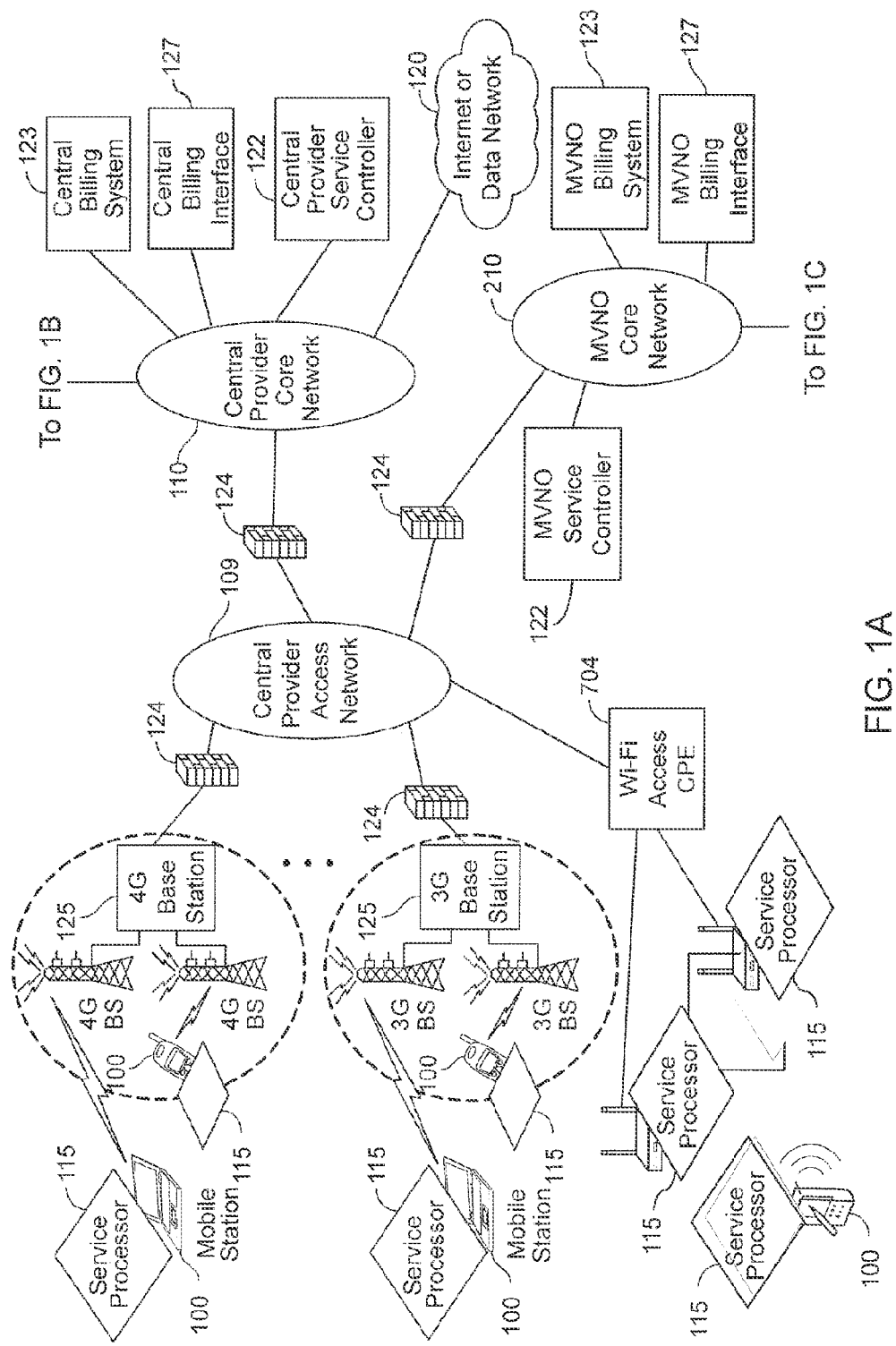
FIGS. 1A, 1B, and 1C illustrate a wireless network architecture for providing device group partitions and a settlement platform in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, device group partitions (e.g., partitions of devices based on associated device groups) are provided, as described herein. For example, one or more device service processor settings are controlled by a service controller, which can be partitioned to allow groups of devices (e.g., device group partitions, such as based on type of device, service plan (such as a service plan that is based on a revenue share and/or any other service plan), geography, service provider, enterprise, user group, or based on any other criteria for grouping devices) to be securely controlled. In some embodiments, a device group partition control capability is enabled by providing a secure network connection to the service policy settings tools that define the device pre-provisioning settings, the device pre-activation service profile settings, the network equipment service activity control policy settings (e.g., access control, routing policy, traffic control, usage limits, and/or policy for usage limit overage), and/or the network billing system database. By providing server tools that enable such settings to be controlled (e.g., or perhaps only observed, such as with respect to the billing system) by a secure workstation or secure website interface that provides network communication with the equipment, for example, that can be used to configure or program the settings, and providing for a secure partitioning of the devices that can be controlled by a given secure workstation or secure website interface, a central provider or a service provider can provide such services to, for example, multiple entities (e.g., an MVNO or an entity, such as a corporation or government agency, allocated a group of devices in a device group partition) that each can have different device and service plan combinations and/or different flavors of services for such devices (e.g., various ambient services, revenue sharing service models, and/or any other services/service plans or combinations thereof). In some embodiments, the networking equipment is implemented to secure device group partitions in which the service policies for a group of devices can be securely controlled.

In some embodiments, the service controller relies entirely on network based service usage measures to determine service usage for a given device, and aggregates or organizes device usage information for multiple devices that belong to a device group partition so that the usage activity for each device within the device group is logged for that device group. In some embodiments, the device service usage activity for each device group is then analyzed and summarized into a service activity report for that device group. In some embodiments, the device group service activity report thus generated is further processed with business logic rules to determine a service activity payment that is owed to a device group partner of a carrier, MVNO or other entity that owns of the service controller settings that determine the manner in which the device usage information is collected, aggregated, analyzed and further processed with business rules. For example, the device group partner can be an OEM, an ambient service partner, a roaming service partner, a carrier network partner, a service seller, a service re-seller, a service wholesaler, an MVNO, a virtual MVNO or other entity that has a business relationship with the entity that owns the service controller settings and wishes to compensate the partner for helping in some way to distribute services or service activations.

In some embodiments, the business rules logic includes a variety of reconciliation algorithms to determine a payment that is due to or from a device group partner. For example, the business rules logic can determine if a device has activated on a service plan and if so which service plan the device was activated on, and this information can be used to either pay an activation incentive payment to a device group partner or can be used to generate a revenue share payment for each billing period a service plan is paid for by the user. Different activation incentive payments or revenue share payments can be made based on which service plan the user activated. For example, if a device activates with a 24 hour session based plan, the one payment can be due, if a device activates with monthly service plan another larger payment is due, and/or if a device activates with a 2 year contract plan then an even larger payment is due. Similarly, in a revenue share example, the revenue share for service usage on a 24 hour plan can be a relatively low revenue share payment, while the revenue share is higher for service usage associated with a monthly service plan and even higher for a longer term contract plan. In other examples, revenue share can also be a fixed percentage of the carrier revenue for a given service plan, with the percentage potentially changing for different service plans. In another example, a user can activate on one service plan but then change to another service plan at a later time and in this case either an activation incentive payment or revenue share payment can be adjusted to reflect the change in service plan. In another example, not all the device service activity for devices within a device group is analyzed and/or provided to a device group service partner, but instead a portion of the device service activity can be analyzed and/or reported. An example where this is desirable is a situation in which an ambient service partner needs to know how much of the partner's ambient service usage was consumed by a device group for purposes of paying for that ambient service usage, but does not need to know or should not be provided with information about device usage for other ambient services or user service plan services. Another example is a device group service partner report that details service partner user purchase transactions only for the device group service partner's services and not for other possible device group service partners.

In some embodiments, the service controller relies at least in part on device based service usage measures to determine service usage for a given device, and aggregates or organizes device usage information for multiple devices that belong to a device group partition so that the usage activity for each device within the device group is logged for that device group.

In some embodiments, the aggregated service activity information for a given device group is made available to a service partner so that the service partner can audit service activity based payments. For example, this information can be made available through a Web UI, a secure web UI, other electronic distribution media or in hard copy format. In some embodiments, the aggregated service information for a device group is further processed with the business rules logic as described herein, and a summary report of service usage or service activation information is made available to the service partner. As similarly discussed herein, this information can be made available in a variety of electronic and/or hardcopy formats. In some embodiments, both the aggregate service usage information and the information that results from further processing with business rules logic are made available to a device group partner.

In some embodiments, a programming interface is provided to allow for programmable definition of the device group service usage information into a device group activity report and/or to allow for a programmable definition of the business rules to analyze the device group service activity reports and create a device group reconciliation report. In some embodiments, this programming interface is provided/implemented as a secure web UI or web portal that allows a device group manager to program the device activity collection rules and/or program the business rules logic used to create the reconciliation report. In some embodiments, the secure web UI includes a pre-defined UI that simplifies the process of writing device group service usage information aggregation filter rules and/or device group service activity information reconciliation filter (e.g., or business logic) rules. In some embodiments, a secure UI is provided so that a device group service partner is allowed to view all or part of the service activity aggregation rules and/or all or part of the reconciliation (e.g., or business logic) rules for the device group the partner is associated with.

In some embodiments, service usage information includes network based service usage information. In some embodiments, the network based service usage information includes network based CDRs (Charging Data Records). In some embodiments, service usage information includes device based service usage information. In some embodiments, device based service usage information includes device assisted CDRs, also referred to herein as micro-CDRs, as described herein. In some embodiments, micro-CDRs are used for CDR mediation or reconciliation that provides for service usage accounting on any device activity that is desired (e.g., providing granular service usage information, such as based on application layer service usage monitoring, transaction service usage monitoring, and/or other types of service usage information). In some embodiments, each device includes a service processor (e.g., a service processor executed on a processor of a communications device, such as a mobile device or an intermediate networking device that can communicate with a wireless network).

In some embodiments, each device activity that is desired to be associated with a billing event is assigned a micro-CDR transaction code, and the service processor is programmed to account for that activity associated with that transaction code (e.g., various transaction codes can be associated with service usage associated with Apple iTunes music, Apple App Store applications, FaceBook social networking, Google search, eBay online commerce, and Amazon Kindle eBooks, respectively, which can be used for providing granular service usage for these various Internet/network based services/sites/transactions and/or any other Internet/network based services/sites, which can include transactional based services, such as Apple iTunes, Apple App Store, and Amazon Kindle). For example, using these techniques, as described herein, essentially any type of device activity can be individually accounted for and/or controlled (e.g., throttled, restricted, and/or otherwise controlled as desired). In some embodiments, the service processor periodically reports (e.g., during each heartbeat or based on any other periodic, push, and/or pull communication technique(s)) micro-CDR usage measures to, for example, a service controller or some other network element/function. In some embodiments, the service controller reformats the heartbeat micro-CDR usage information into a valid CDR format (e.g., a CDR format that is used and can be processed by an SGSN or GGSN or some other authorized network element/function for CDRs) and then transmits the reformatted micro-CDRs to a network element/function for performing CDR mediation.

In some embodiments, CDR mediation is used to properly account for the micro-CDR service usage information by depositing it into an appropriate service usage account and deducting it from the user device bulk service usage account. For example, this technique provides for a flexible service usage billing solution that uses pre-existing solutions for CDR mediation and billing. For example, the billing system can process the mediated CDR feed from CDR mediation, apply the appropriate account billing codes to the aggregated micro-CDR information that was generated by the device, and then generate billing events in a manner that does not require changes to existing billing systems, infrastructures, and techniques (e.g., using new transaction codes to label the new device assisted billing capabilities).

In some embodiments, the communications device is a mobile communications device, and the service includes one or more Internet based services, and the mobile communications device includes one or more of the following: a mobile phone, a PDA, an eBook reader, a music device, an entertainment/gaming device, a computer, laptop, a netbook, a tablet, and a home networking system. In some embodiments, the communications device includes a modem, and the processor is located in the modem. In some embodiments, an intermediate networking device includes any type of networking device capable of communicating with a device and a network, including a wireless network, example intermediate networking devices include a femto cell, or any network communication device that translates the wireless data received from the device to a network, such as an access network. In some embodiments, intermediate networking devices include 3G/4G WWAN to WLAN bridges/routers/gateways, femto cells, DOCSIS modems, DSL modems, remote access/backup routers, and other intermediate network devices.

In some embodiments, a revenue sharing model is provided using a settlement platform. In some embodiments, a revenue sharing model is provided using a settlement platform for providing one or more of the following: service activation revenue share or bounty (e.g., to one or more partners, such as OEMs, an ambient service partner, a roaming service partner, a carrier network partner, a device retailer or distributor, a service seller, a service re-seller, distributors, MVNOs, carriers, and/or service providers), service usage billing (e.g., to one or more partners, such as OEMs, distributors, MVNOs, carriers, and/or service providers), service usage revenue share (e.g., to one or more partners, such as OEMs, distributors, MVNOs, carriers, and/or service providers), and transactional revenue share (e.g., to one or more partners, such as an OEM, an ambient service partner, a roaming service partner, a carrier network partner, a device retailer or distributor, a service seller, a service re-seller, distributors, MVNOs, carriers, and/or service providers). For example, a revenue sharing model can allow for a distribution partner to access activation information for a specified device or a specified device group for which they are potentially entitled to a bounty (e.g., a fixed fee or some other payment or credit terms, etc.) for activation, and the revenue sharing model can also allow for one or more OEMs (e.g., or other device group partner) access to information regarding service usage for the specified device or the specified device group for which they are potentially entitled to a service usage revenue share (e.g., percentage, fixed fee, transactional fee or credit, or some other form of revenue share) for the associated or particular service usage. For example, a distributor (e.g., Amazon, Best Buy, or any other distributor) can be allocated a bounty for each activated eBook reader based on service activation for that eBook reader (e.g., the value/terms of the bounty can vary based on the type of service that is activated for that eBook reader, such as an ambient service versus a premium data plan service), and the bounty can also require activation within a certain period of time of the sale (e.g., if activated within 30 days after sale by the distributor of the eBook to a customer). As another example, a service revenue share can be provided with an OEM (e.g., Sony or Google, or another eBook manufacturer, or another device group distribution partner), for example, for a period of time after the initial activation of the eBook reader (e.g., 2 years after activation), which is referred to herein as, for example, a service revenue bounty, a service revenue share, or a service revenue sharing model. In some embodiments, a partner (e.g., Amazon, Barnes & Noble, Google, or any other partner) pays for or subsidizes the cost of the associated service usage for the eBook reader, and a revenue share for each book paid for by the service provider is provided (e.g., a transactional service revenue share) between the service provider (e.g., carrier, central provider, MVNO, and/or other service provider) and the partner. In some embodiments, these and other revenue share model techniques are implemented using a settlement platform, as described herein. In some embodiments, these and other revenue share and service billing techniques are implemented using a settlement platform and micro-CDRs, as described herein.

In some embodiments, a billing interface is provided between the service controller and the billing system (e.g., an external service plan read/write interface). In some embodiments, the service controller periodically polls the billing system interface with a request/command (e.g., "read-billing-plan" command) to determine if the user has changed the service plan of choice through some interface other than the service processor service plan selection UI (User Interface) (e.g., Internet or phone). If the user has changed the service plan, then the service controller updates the service plan of record on the service controller database and on the device (e.g., via secure communication with the service processor executing on a processor of the device). In some embodiments, another request/command (e.g., the "write-billing-plan" interface command) is used to inform the billing system when the user has selected a new or initial plan option from the service processor service plan selection UI.

In some embodiments, a settlement platform is provided, as described herein. In some embodiments, the settlement platform includes support for an activation process (e.g., to facilitate tracking and payment of a bounty for one or more partners for an activation). In some embodiments, the settlement platform provides a service/transactional revenue share settlement platform. In some embodiments, the settlement platform distributes accounting and settlement information to one or more of carriers, distribution partners, MVNOs (Mobile Virtual Network Operator), wholesale partners, and/or other partners (e.g., for a service usage billing to one or more partners and/or for a service/transactional revenue share with one or more partners). In some embodiments, the settlement platform receives and processes (network based) CDRs and/or micro-CDRs. In some embodiments, the settlement platform processes CDRs and/or micro-CDRs for CDR mediation that provides for service usage accounting (e.g., service usage billing allocation and/or service usage/transactional revenue share) on any device activity that is desired. In some embodiments, the settlement platform receives and processes micro-CDRs to determine accounting and settlement information for various services used by such devices. In some embodiments, the settlement platform receives and processes micro-CDRs to determine accounting and settlement information for various services for such devices and distributes the accounting and settlement information to one or more of carriers, distribution partners, MVNOs, wholesale partners, and/or other partners or entities, as described herein.

In some embodiments, multiple device groups are supported in which each device group is provided an independent and secure management for transparent reconciliation. In some embodiments, a service provider selects who receives a reconciliation report of activations and service usage based on a service plan type. In some embodiments, service usage information (e.g., CDRs and/or micro-CDRs) are used for service plan billing and/or reconciliation reports. In some embodiments, different service plans on the same device can be communicated to different partners and/or the same partner (e.g., one or more of carriers, distribution partners, MVNOs, and/or wholesale partner). In some embodiments, multi-device and multi-user reconciliation capabilities are provided. In some embodiments, service/transactional revenue share techniques as described herein are provided to augment and/or replace bounty-plus-subsidy models for non-carrier channels. For example, the settlement platform can be used to implement a revenue share model allocating shared service usage revenue among two or more partners (e.g., one or more of carriers, distribution partners, MVNOs, wholesale partners, and/or other partners) for one or more services (e.g., for a discounted bounty or in lieu of a bounty, the mobile device provider can receive a service/transactional revenue share for one or more services provided by a service provider for a mobile device distributed/sold through the service provider).

Figure 1B:
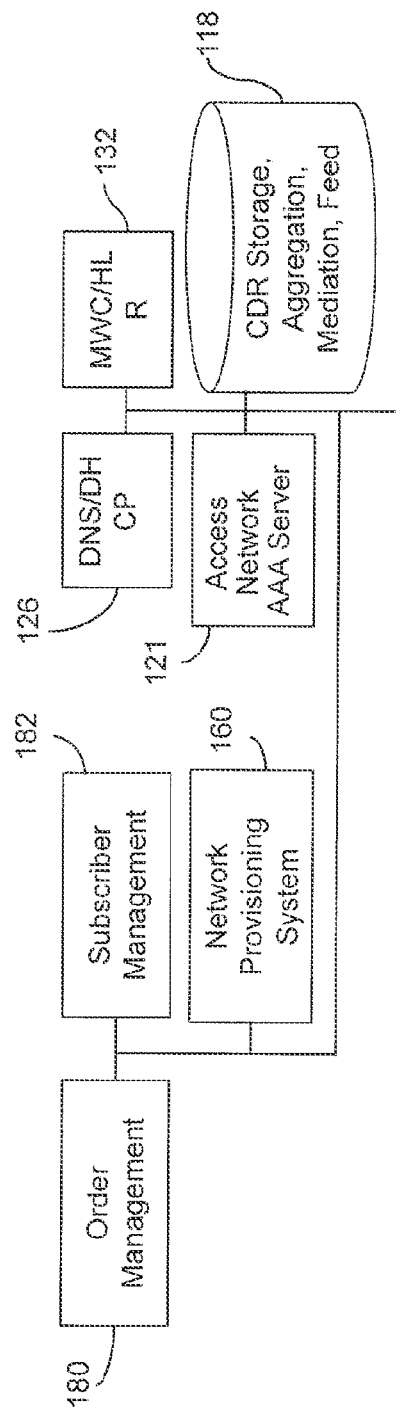
Figure 1C:
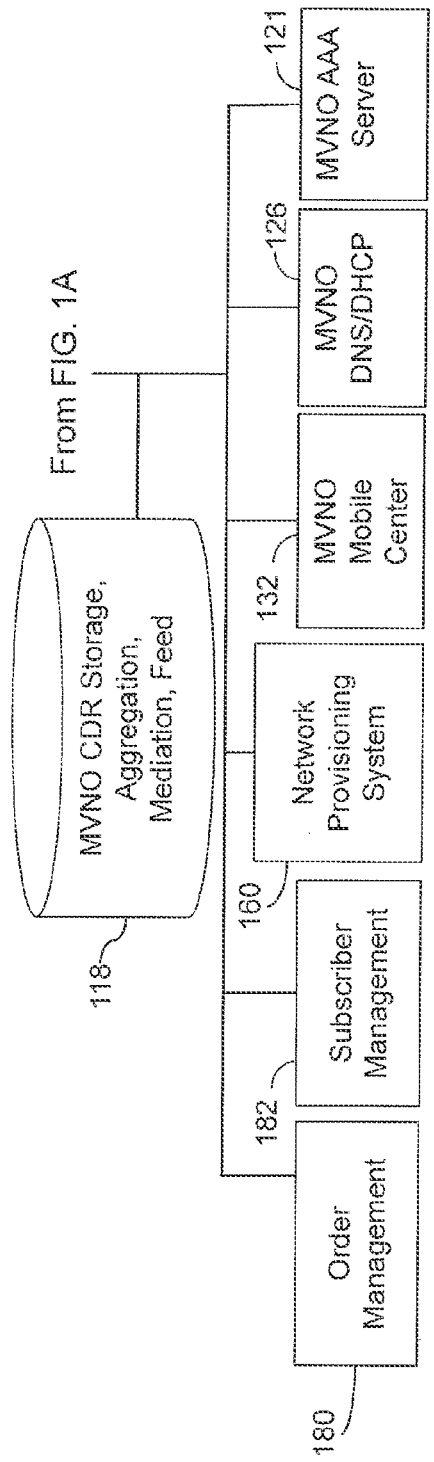

FIGS. 1A, 1B, and 1C illustrate a wireless network architecture for providing device group partitions and a settlement platform in accordance with some embodiments. As shown, FIG. 1A includes a 4G/3G/2G wireless network operated by, for example, a central provider. As shown, various wireless devices 100 are in communication with base stations 125A and 125B for wireless network communication with the wireless network (e.g., via a firewall 124), and other devices 100 are in communication with Wi-Fi Access Points (APs) or Mesh 702 for wireless communication to Wi-Fi Access CPE 704 in communication with central provider access network 109. In some embodiments, each of the wireless devices 100 includes a service processor 115 (as shown) (e.g., executed on a processor of the wireless device 100), and each service processor connects through a secure control plane link to a service controller 122 (e.g., using encrypted communications).

In some embodiments, service usage information includes network based service usage information (e.g., network based service usage measures or CDRs, which can, for example, be generated by service usage measurement apparatus in the network equipment), which is obtained from one or more network elements (e.g., base stations (BTS/BSCs) 125A and 125B, RAN Gateways (not shown), Transport Gateways (not shown), Mobile Wireless Center/HLRs 132, AAA 121, Service Usage History/CDR Aggregation, Mediation, Feed 118, or other network equipment). In some embodiments, service usage information includes micro-CDRs. In some embodiments, micro-CDRs are used for CDR mediation or reconciliation that provides for service usage accounting on any device activity that is desired. In some embodiments, each device activity that is desired to be associated with a billing event is assigned a micro-CDR transaction code, and the service processor 115 is programmed to account for that activity associated with that transaction code. In some embodiments, the service processor 115 periodically reports (e.g., during each heartbeat or based on any other periodic, push, and/or pull communication technique(s)) micro-CDR usage measures to, for example, the service controller 122 or some other network element. In some embodiments, the service controller 122 reformats the heartbeat micro-CDR usage information into a valid CDR format (e.g., a CDR format that is used and can be processed by an SGSN or GGSN or other network elements/equipment used/authorized for generating or processing CDRs) and then transmits it to a network element/function for CDR mediation (e.g., CDR Storage, Aggregation, Mediation, Feed 118).

In some embodiments, CDR mediation is used to account for the micro-CDR service usage information by depositing it into an appropriate service usage account and deducting it from the user device bulk service usage account. For example, this technique provides for a flexible service usage billing solution that uses pre-existing solutions, infrastructures, and/or techniques for CDR mediation and billing. For example, the billing system (e.g., billing system 123 or billing interface 127) processes the mediated CDR feed from CDR mediation, applies the appropriate account billing codes to the aggregated micro-CDR information that was generated by the device, and then generates billing events in a manner that does not require changes to the existing billing systems (e.g., using new transaction codes to label the new device assisted billing capabilities). In some embodiments, network provisioning system 160 provisions various network elements/functions for authorization in the network, such as to authorize certain network elements/functions (e.g., CDR storage, aggregation, mediation, feed 118 or other network elements/functions) for providing micro-CDRs, reformatted micro-CDRs, and/or aggregated or reconciled CDRs.

As shown in FIG. 1, a CDR storage, aggregation, mediation, feed 118 is provided. In some embodiments, the CDR storage, aggregation, mediation, feed 118 receives, stores, aggregates and mediates micro-CDRs received from mobile devices 100. In some embodiments, the CDR storage, aggregation, mediation, feed 118 also provides a settlement platform using the mediated micro-CDRs, as described herein. In some embodiments, another network element provides the settlement platform using aggregated and/or mediated micro-CDRs (e.g., central billing interface 127 and/or another network element/function).

In some embodiments, various techniques for partitioning of device groups are used for partitioning the mobile devices 100 (e.g., allocating a subset of mobile devices 100 for a distributor, an OEM, a MVNO, and/or another partner or entity). As shown in FIGS. 1A and 1C, a MVNO core network 210 includes a MVNO CDR storage, aggregation, mediation, feed 118, a MVNO billing interface 127, and a MVNO billing system 123 (and other network elements as shown in FIGS. 1A and 1C). In some embodiments, the MVNO CDR storage, aggregation, mediation, feed 118 receives, stores, aggregates and mediates micro-CDRs received from mobile devices 100 (e.g., MVNO group partitioned devices).

Those of ordinary skill in the art will appreciate that various other network architectures can be used for providing device group partitions and a settlement platform, and FIG. 1 is illustrative of just one such example network architecture for which device group partitions and settlement platform techniques described herein can be provided.

In some embodiments, CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment apparatus/systems attached to one or more of the sub-networks shown in FIG. 1 (e.g., central provider access network 109 and/or central provider core network 110), which is in communication with the service controller 122 and a central billing interface 127. As shown in FIG. 1, service usage 118 provides a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register(HLR) 132 (as shown, in communication with a DNS/DHCP server 126). In some embodiments, service usage 118 functionality is located or partially located in the base station, base station controller and/or base station aggregator, collectively referred to as base stations 125A and 125B in FIG. 1. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be easily generalized as described herein and as shown in the other figures and embodiments described herein by one of ordinary skill in the art. Also as shown in FIG. 1, the service controller 122 is in communication with the central billing interface 123 (also sometimes referred to as the external billing management interface or billing communication interface) 127, which is in communication with the central billing system 123. As shown in FIG. 1, an order management 180 and subscriber management 182 are also in communication with the central provider core network 110 for facilitating order and subscriber management of services for the devices 100 in accordance with some embodiments.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated/assisted service usage information (e.g., micro-CDRs) for one or more devices on the wireless network (e.g., devices 100); and provides the device generated service usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, as described herein, the CDR storage, aggregation, mediation, feed 118 collects/receives micro-CDRs for one or more devices on the wireless network (e.g., devices 100). In some embodiments, the CDR storage, aggregation, mediation, feed 118 (and/or other network elements or combinations of network elements) includes a service usage data store (e.g., a billing aggregator) and a rules engine for aggregating the collected device generated service usage information. In some embodiments, the network device is a CDR feed aggregator, and the CDR storage, aggregation, mediation, feed 118 (and/or other network elements or combinations of network elements) also aggregates (network based) CDRs and/or micro-CDRs for the one or more devices on the wireless network; applies a set of rules to the aggregated CDRs and/or micro-CDRs using a rules engine (e.g., bill by account, transactional billing, revenue sharing model, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service). In some embodiments, a revenue sharing platform is provided using various techniques described herein.

In some embodiments, the CDR storage, aggregation, mediation, feed 118 (and/or other network elements or combinations of network elements) communicates a new set of CDRs (e.g., aggregated and mediated CDRs and/or micro-CDRs that are then translated into standard CDRs for a given wireless network) for the one or more devices on the wireless network to a billing interface (e.g., central billing interface 127) or a billing system (e.g., central billing system 123). In some embodiments, the CDR storage, aggregation, mediation, feed 118 (and/or other network elements or combinations of network elements) communicates with a service controller (e.g., service controller 122) to collect the device generated service usage information (e.g., micro-CDRs) for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated service usage information to a billing interface or a billing system. In some embodiments, the CDR storage, aggregation, mediation, feed 118 (and/or other network elements or combinations of network elements) communicates with a transport gateway and/or a Radio Access Network (RAN) gateway to collect the network generated/based service usage information for the one or more devices on the wireless network. In some embodiments, the service controller 122 communicates the device assisted service usage information (e.g., micro-CDRs) to the CDR storage, aggregation, mediation, feed 118 (and/or other network elements or combinations of network elements).

In some embodiments, the CDR storage, aggregation, mediation, feed 118 (and/or other network elements or combinations of network elements) performs rules for performing a bill by account aggregation and mediation function. In some embodiments, the CDR storage, aggregation, mediation, feed 118 (and/or other network elements or combinations of network elements) performs rules for performing a service billing function, as described herein, and/or for performing a service/transactional revenue sharing function, as described herein. In some embodiments, the service controller 122 in communication with the CDR storage, aggregation, mediation, feed 118 (and/or other network elements or combinations of network elements) performs a rules engine for aggregating and mediating the device assisted service usage information (e.g., micro-CDRs). In some embodiments, a rules engine device in communication with the CDR storage, aggregation, mediation, feed 118 (and/or other network elements or combinations of network elements) performs a rules engine for aggregating and mediating the device assisted service usage information.

In some embodiments, the rules engine is included in (e.g., integrated with/part of) the CDR storage, aggregation, mediation, feed 118. In some embodiments, the rules engine and associated functions, as described herein, is a separate function/device. In some embodiments, the service controller 122 performs some or all of these rules engine based functions, as described herein, and communicates with the central billing interface 127. In some embodiments, the service controller 122 performs some or all of these rules engine based functions, as described herein, and communicates with the central billing system 123.

In some embodiments, a settlement platform service is provided. For example, micro-CDRs can be aggregated and mediated to associate service usage for one or more services used by a communications device (e.g., a user of the communications device). A rules engine or another function can determine a revenue share allocation for the service usage for a particular service to determine the settlement for such service usage for the revenue sharing allocation/model and to distribute accounting and settlement information to one or more of carriers, distribution partners, MVNOs, wholesale partners, and/or other partners or entities. In some embodiments, the service is a transactional service.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., managed devices). For example, this approach can provide for the same level of reporting, lower level of reporting, and/or higher level of reporting as compared to the reporting required by the central billing system 123.

In some embodiments, a bill-by-account billing offset is provided. For example, bill-by-account billing offset information can be informed to the central billing system 123 by providing a CDR aggregator feed that aggregates the device assisted service usage data feed to provide a new set of CDRs for the managed devices to the central billing interface 127 and/or the central billing system 123. In some embodiments, transaction billing is provided using similar techniques. For example, transaction billing log information can be provided to the central billing interface 127 and/or the central billing system 123.

In some embodiments, the rules engine (e.g., performed by the service usage 118 or another network element, as described herein) provides a bill-by-account billing offset. For example, device assisted service usage information (e.g., micro-CDRs) includes a transaction type field or transaction code (e.g., indicating a type of service for the associated service usage information). For example, the rules engine can apply a rule or a set of rules based on the identified service associated with the device generated service usage information to determine a bill-by-account billing offset (e.g., a new CDR can be generated to provide the determined bill-by-account billing offset). In some examples, the determined bill-by-account billing offset can be provided as a credit to the user's service usage account (e.g., a new CDR can be generated with a negative offset for the user's service usage account, such as for network chatter service usage, or transactional service usage, or for any other purposes based on one or more rules performed by the rules engine).

As another example, for a transactional service, a first new CDR can be generated with a negative offset for the user's service usage account for that transactional service related usage, and a second new CDR can be generated with a positive service usage value to charge that same service usage to the transactional service provider (e.g., Amazon, eBay, or another transactional service provider). In some embodiments, the service controller 122 generates these two new CDRs, and the service usage 118 stores, aggregates, and communicates these two new CDRs to the central billing interface 127. In some embodiments, the service controller 122 generates these two new CDRs, and the service usage 118 stores, aggregates, and communicates these two new CDRs to the central billing interface 127, in which the central billing interface 127 applies rules (e.g., performs the rules engine for determining the bill-by-account billing offset).

In some embodiments, the service controller 122 sends the device generated CDRs to the rules engine (e.g., a service usage data store and rules engine, such as CDR storage, aggregation, mediation, feed 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network (e.g., by network provision system 160) and behaves substantially similar to other CDR generators on the network).

In some embodiments, the service controller 122 is provisioned as a new type of networking function that is recognized as a valid, authorized, and secure source for CDRs by the other necessary elements in the network (e.g., CDR storage, aggregation, mediation, feed 118). In some embodiments, if the necessary network apparatus only recognize CDRs from certain types of networking equipment (e.g. a RAN gateway or transport gateway), then the service controller 122 provides authentication credentials to the other networking equipment that indicate that it is one of the approved types of equipment for providing CDRs. In some embodiments, the link between the service controller 122 and the necessary CDR aggregation and mediation equipment is secured, authenticated, encrypted, and/or signed.

In some embodiments, the CDR storage, aggregation, mediation, feed 118 discards the network based service usage information (e.g., network based CDRs) received from one or more network elements. In these embodiments, the service controller 122 provides the device assisted service usage information (e.g., device based CDRs or micro-CDRs) to the CDR storage, aggregation, mediation, feed 118 (e.g., the CDR storage, aggregation, mediation, feed 118 can just provide a store, aggregate, and communication function(s), as it is not required to mediate network based CDRs and device assisted CDRs), and the device based service usage information is provided to the central billing interface 127 or the central billing system 123.

In some embodiments, the device based CDRs (e.g., micro-CDRs) and/or new CDRs generated based on execution of a rules engine as described herein are provided only for devices that are managed and/or based on device group, service plan, or any other criteria, categorization, and/or grouping, such as based on ambient service or ambient service provider or transactional service or transactional service provider.

Figure 2:
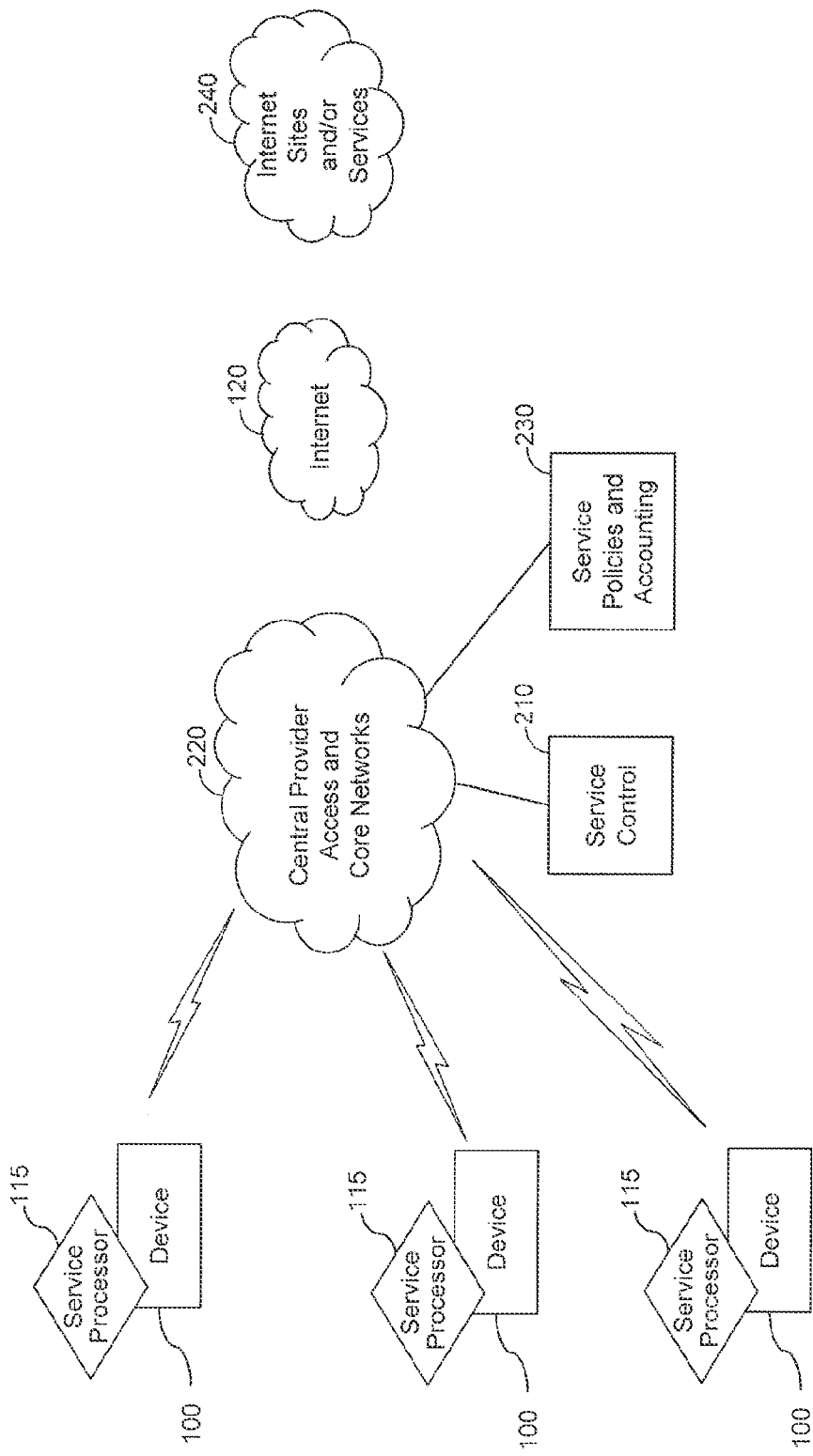
FIG. 2 illustrates another wireless network architecture for providing device group partitions and a settlement platform in accordance with some embodiments.

FIG. 2 illustrates another wireless network architecture for providing device group partitions and a settlement platform in accordance with some embodiments. As shown, FIG. 2 includes various devices 100 including service processors 115. For example, devices 100 can include various types of mobile devices, such as phones, PDAs, computing devices, laptops, netbooks, tablets, cameras, music/media players, GPS devices, networked appliances, and any other networked device; and/or devices 100 can include various types of intermediate networking devices, as described herein. The devices 100 are in communication with service control 210 and central provider access and core networks 220. Service policies and accounting functions 230 are also provided in communication with the central provider access and core networks 220. For example, devices 100 can communicate via the central provider access and core networks 220 to the Internet 120 for access to various Internet sites/services (e.g., Google sites/services, Yahoo sites/services, Blackberry services, Apple iTunes and AppStore, Amazon.com, FaceBook, and/or any other Internet service or other network facilitated service).

In some embodiments, FIG. 2 provides a wireless network architecture that supports partitioned device groups, in which each device group can be provided independent and secure management of transparent reconciliation. Those of ordinary skill in the art will appreciate that various other network architectures can be used for providing device group partitions and a settlement platform, and FIG. 2 is illustrative of just another such example network architecture for which device group partitions and settlement platform techniques described herein can be provided.

In some embodiments, a service provider selects who receives a reconciliation report of activations and usage by service plan type. In some embodiments, service usage information (e.g., based on CDRs and/or micro-CDRs or other service usage measures) are used for service plan billing and for reconciliation reports. In some embodiments, different service plans on the same device (e.g., device 100) can be sent to different partners or the same partner. In some embodiments, multi-device and multi-user reconciliation capabilities are provided. In some embodiments, a settlement platform service is provided. In some embodiments, various revenue share techniques as described herein are provided (e.g., implemented using a settlement platform service, using, for example, service policies and accounting functions 230).

In some embodiments, partitioned device groups are provided. In some embodiments, each partitioned group of devices (e.g., mobile devices 100) can be uniquely managed with secure admin log-ins. In some embodiments, multi-device, multi-user accounting is provided. In some embodiments, capabilities are provided to support multi-party/multi-service reconciliation records to carriers and carrier partners, which can also support various service/transactional revenue share techniques (e.g., for reducing or eliminating the up-front subsidy and associated up-front subsidy risk of certain bounty models). In some embodiments, service usage and profitability analytics are provided (e.g., using aggregated CDRs/micro-CDRs and service policies and accounting functions 230). For example, a partitioned beta test group of devices can be tested and optimized for various service usage policies and/or service plans, and then the optimized service usage policies and/or service plans can be published to an entire or larger device group. In some embodiments, a carrier can be provided a carrier branded device group, and/or a MVNO can be provided a MVNO branded device group.

Figure 3:
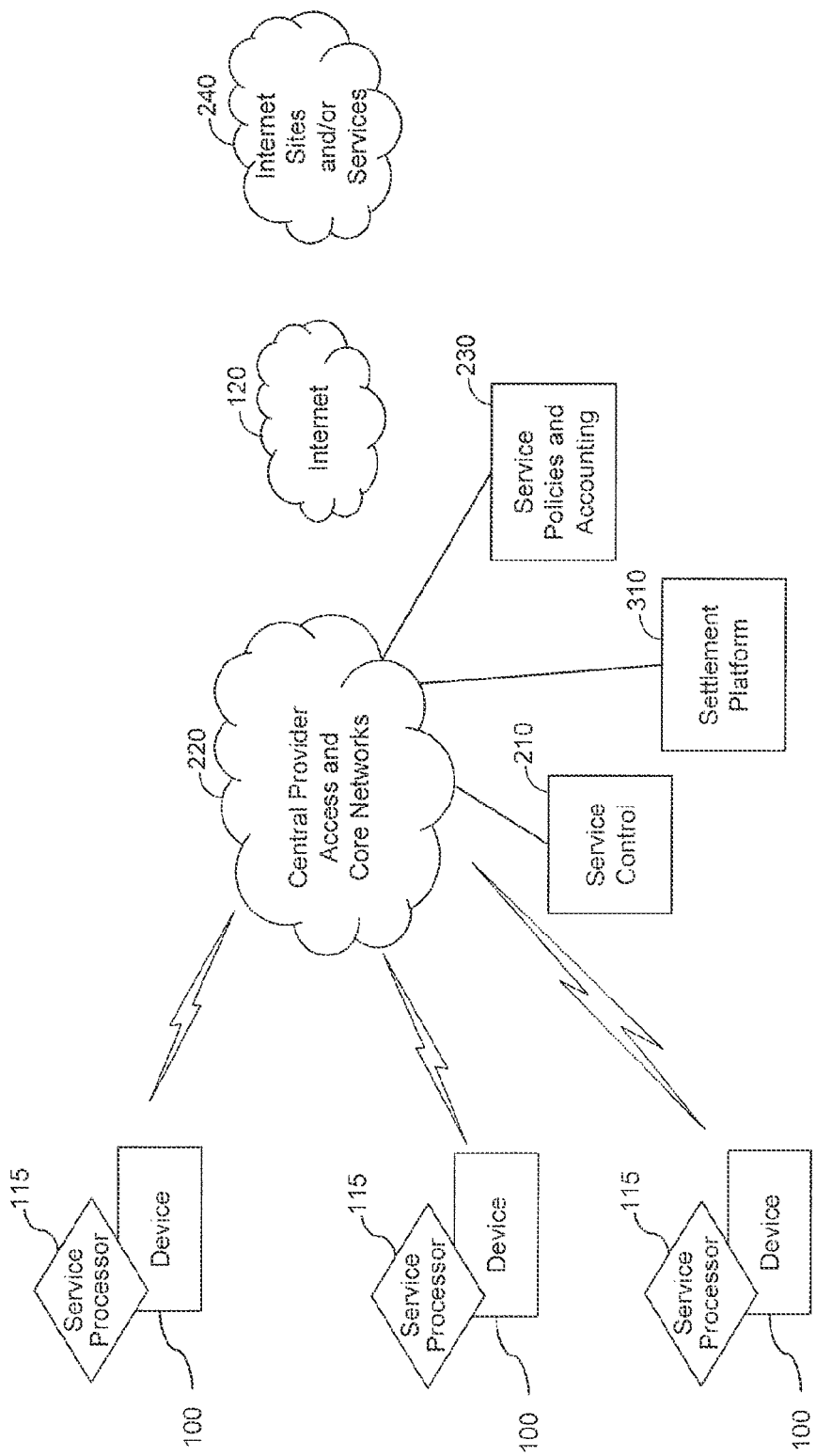
FIG. 3 illustrates a wireless network architecture including a settlement platform in accordance with some embodiments.

FIG. 3 illustrates a wireless network architecture including a settlement platform in accordance with some embodiments. As shown in FIG. 3, a settlement platform 310 is provided (and other network elements are also provided as similarly shown in and described above with respect to FIG. 2). In some embodiments, the settlement platform 310 receives, stores, aggregates and mediates micro-CDRs received from mobile devices 100. In some embodiments, the settlement platform 310 provides a settlement platform using the mediated micro-CDRs, as described herein. In some embodiments, the settlement platform 310 in combination with one or more other network elements/functions provides the settlement platform using aggregated and/or mediated micro-CDRs (e.g., central billing interface 127 and/or service policies and accounting 230). Those of ordinary skill in the art will appreciate that various other network architectures can be used for providing device group partitions and a settlement platform, and FIG. 3 is illustrative of just one such example network architecture for which device group partitions and settlement platform techniques described herein can be provided.

As shown in FIG. 3, the settlement platform 310 provides a function in communication with the central provider access and core networks 220. In some embodiments, the settlement platform 310 (e.g., including a billing aggregation data store and rules engine) is a functional descriptor for, in some embodiments, a device/network level service usage information collection, aggregation, mediation, and reporting function located in one or more of the networking equipment apparatus/systems attached to one or more of the sub-networks, which is in communication with the service control 210 and/or service policies and accounting 230. In some embodiments, the settlement platform 310 function is located elsewhere in the network or partially located in elsewhere or integrated with/as part of other network elements (e.g., settlement platform 310 functionality can be located or partially located in the service control 210 and/or the service policies and accounting function 230 as shown in FIG. 2; and/or in the AAA server 121, the mobile wireless center/Home Location Register(HLR) 132, the base stations 125A and 125B, the networking component in the central provider access network 109, a networking component in the core network 110, the central billing system 123, the central billing interface 127, and/or in another network component or function, as shown in FIGS. 1A, 1B, and 1C).

In some embodiments, the settlement platform 310 includes the CDR storage, aggregation, mediation, feed 118 function as shown in and described above with respect to FIGS. 1B and 1C and further provides a device/network level service usage information collection, aggregation, mediation, and reporting function. In some embodiments, the rules engine is included in (e.g., integrated with/part of) the settlement platform 310. In some embodiments, the rules engine and associated functions, as described herein, is a separate function/device. In some embodiments, the service control 210 performs some or all of these rules engine based functions, as discussed herein, and communicates with the settlement platform 310 and/or the service policies and accounting 230. In some embodiments, the service control 210 includes the service controller 122 as shown in and similarly described above with respect to FIGS. 1A, 1B, and 1C.

In some embodiments, a settlement platform service is provided at least in part by the settlement platform 310. For example, as similarly described above, micro-CDRs can be aggregated and mediated to associate service usage for one or more services used by a user on a device 100. A rules engine or another function can determine a revenue share allocation for the service usage for a particular service to determine the settlement (e.g., billing and/or revenue share) for such service usage, such as for a service/transactional revenue share, and to distribute accounting and settlement information to one or more of carriers, distribution partners, MVNOs, wholesale partners, and/or other partners or entities. In some embodiments, the service is a transactional service.

Figure 4:
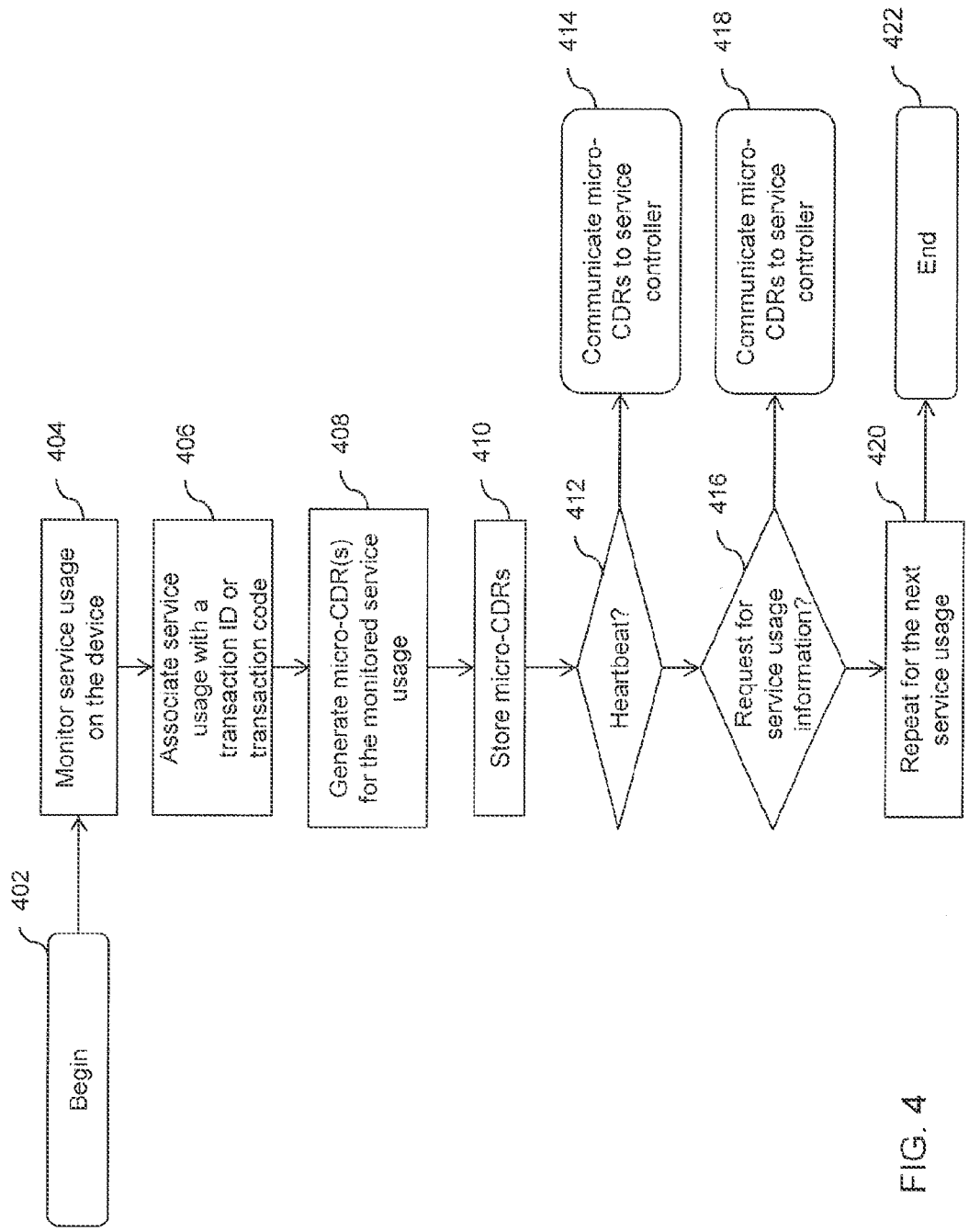
FIG. 4 illustrates a flow diagram for providing device assisted service usage information in accordance with some embodiments.

FIG. 4 illustrates a flow diagram for providing device assisted service usage information in accordance with some embodiments. At 402, the process for providing device assisted service usage information begins. At 404, service usage on the device is monitored (e.g., using a service processor executing on a processor of the device). At 406, the monitored service usage is associated with a transaction ID or transaction code (e.g., using a service processor, such as service processor 115 that provides, for example, application service level monitoring, different transaction codes are assigned to Google services, eBay services, Amazon services, Apple iTunes services, and/or other service usage activities/services). In some embodiments, monitored services include transaction based services that are monitored and assigned unique transaction codes. At 408, micro-CDR(s) are generated for the monitored service usage. At 410, the generated micro-CDRs are stored (e.g., at least until the micro-CDR(s) are communicated to the network, such as the service controller or another network element/function, such as service control 210). At 412, a heartbeat communication event is determined. At 414, if a heartbeat communication is to be provided (e.g., to communicate to the network, such as service controller 122 or another network element, such as service control 210), then the micro-CDRs are sent to the service controller (e.g., service controller 122 or another network element, such as in service control 210). At 416, a request for service usage information is determined. At 418, in response to such a request, the micro-CDRs (e.g., stored or queued micro-CDRs or a set of specifically requested micro-CDRs) are sent to the service controller (e.g., service controller 122 or another network element, such as service control 210). At 420, the process is repeated for any other monitored service usage. At 422, the process is completed.

Figure 5:
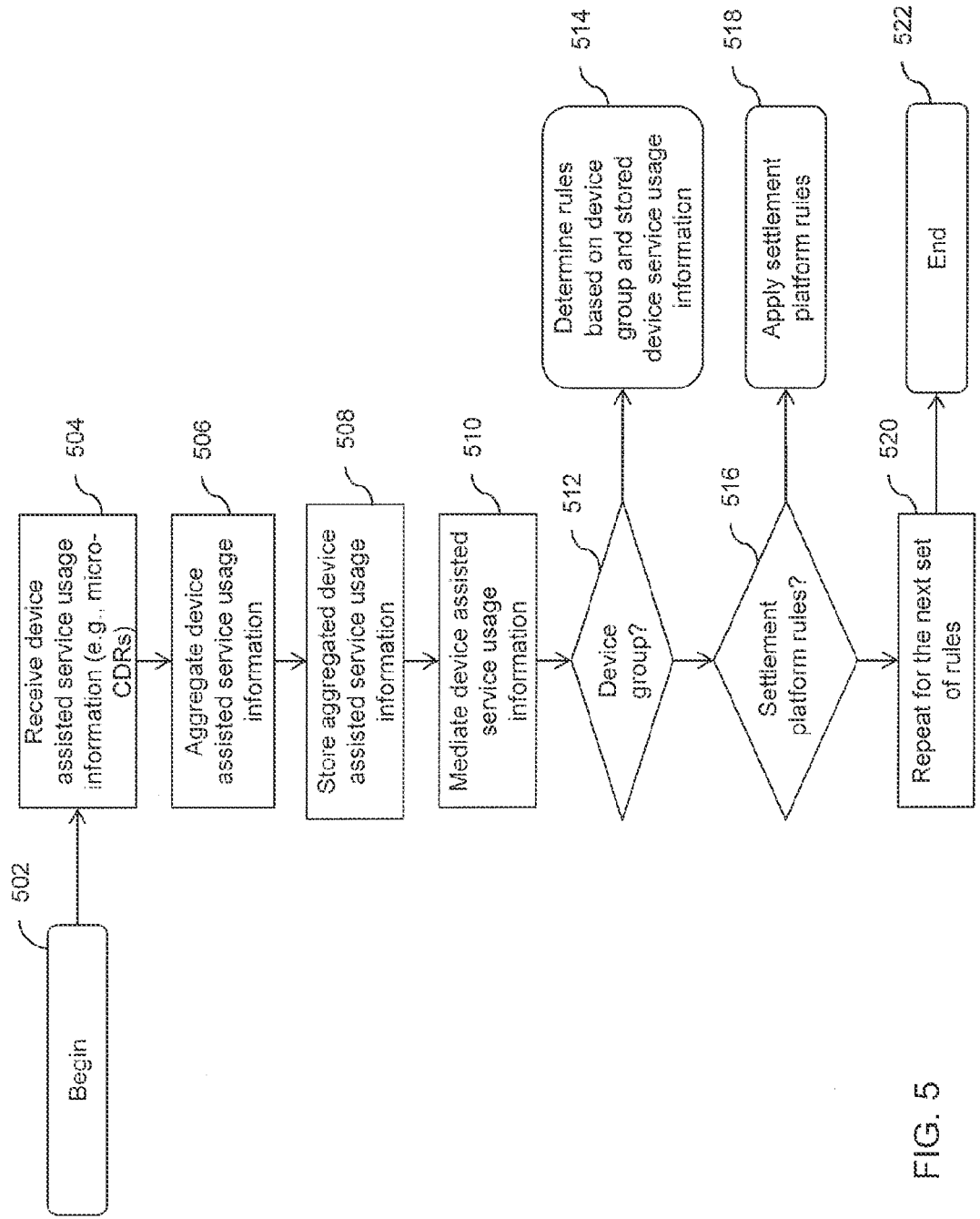
FIG. 5 illustrates a flow diagram for providing a settlement platform service in accordance with some embodiments.

FIG. 5 illustrates a flow diagram for providing a settlement platform service in accordance with some embodiments. At 502, the process for a settlement platform begins. At 504, device assisted service usage information is received (e.g., micro-CDRs). At 506, device assisted service usage information is aggregated (e.g., based on the device and the service, such as based on associated settlement platform rules for the device and the service). At 508, the aggregated device assisted service usage information is stored. At 510, the device assisted service usage information is mediated/reconciled (e.g., based on various other measures, such as network based service usage information, and/or other metrics/criteria or techniques, such as the various techniques described herein). At 512, whether the device is a member of a device group is determined. At 514, the rules associated with that device's device group are determined. At 516, whether any settlement platform rules apply to that device group and a given service for the stored device service usage information for the device is determined (e.g., service billing and/or service/transactional revenue share related or other related rules). At 518, the settlement platform rules for the associated service usage for that device and the relevant service are applied. In some embodiments, a revenue share for the service usage for a particular service is used to determine the settlement for such service usage based on the revenue sharing allocation/model and is further used to distribute accounting and settlement information to one or more of carriers, distribution partners, MVNOs, wholesale partners, and/or other partners or entities. In some embodiments, service billing is allocated among one or more partners for a service usage. In some embodiments, a transactional revenue share among one or more partners for a transactional service is applied. At 520, the process is repeated for additional settlement platform rules. At 522, the process is completed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method performed by a network system communicatively coupled to an end-user device via a wireless network, wherein the end-user device is a device configured to send or receive data over the wireless network, the method comprising:

obtaining service usage information associated with the end-user device from one or more sources, wherein at least one of the one or more sources is the end-user device or a network source, the service usage information identifying one or more device activities of the end-user device and comprising a measure of usage of the wireless network associated with the one or more device activities;

using one or more electronically-stored rules and the service usage information, generating first information and second information, the first information usable by an operator of the wireless network in providing, to a first entity, a first accounting of a first portion of the usage of the wireless network associated with the one or more device activities, the first entity being an entity other than a user of the end-user device and other than the operator of the wireless network, the second information usable by the operator of the wireless network in providing, to a second entity, a second accounting of at least a second portion of the usage of the wireless network associated with the one or more device activities; and providing the first information and the second information to a network element communicatively coupled to the network system in a syntax usable by the network element.

2. The method of claim 1, wherein the service usage information comprises one or more transaction codes.

3. The method of claim 1, wherein each of the one or more device activities is associated with a billing event.

4. The method of claim 1, wherein at least one of the one or more device activities comprises a network access associated with a search, an online commerce activity, book downloading, music downloading, music streaming, video downloading, video streaming, application downloading, content downloading, a voice service, a transaction service, an advertising service, or Internet-based services or transactions.

5. The method of claim 1, wherein at least one of the one or more device activities comprises a network access associated with a particular end-user device application or program, a particular network end point, a particular website, a particular content source, a particular content type, a particular transaction service, or a particular e-commerce service.

6. The method of claim 1, further comprising:
based on the first information, generating a first bill associated with the first entity; and
based on the second information, generating a second bill associated with the second entity.

7. The method of claim 1, further comprising the network element providing or making available a report based on the first information or the second information.

8. The method of claim 1, wherein the one or more sources comprise the end-user device and the network source, and wherein the service usage information comprises a first charging data record (CDR) from the end-user device and a second CDR from the network source.

9. The method of claim 1, wherein the one or more sources comprise a first network source and a second network source, and wherein the service usage information comprises a first charging data record (CDR) from the first network source and a second CDR from the second network source.

10. The method of claim 1, wherein the one or more sources comprise the network source, and wherein the service usage information comprises a first charging data record (CDR) from the network source and a second CDR from the network source.

11. The method of claim 1, wherein the first information or the second information identifies a particular device activity available to the end-user device.

12. The method of claim 1, wherein the one or more electronically-stored rules are configured to assist in allocating billing for the usage of the wireless network associated with the one or more device activities between the first entity and the second entity.

13. The method of claim 1, wherein the one or more electronically-stored rules are configured to assist in:
including the first portion of the usage of the wireless network associated with the one or more device activities in the first information, and
including the second portion of the usage of the wireless network associated with the one or more device activities in the second information.

14. The method of claim 13, wherein the first portion of the usage of the wireless network associated with the one or more device activities is associated with a first device activity of the one or more device activities, and wherein the second portion of the usage of the wireless network associated with the one or more device activities is associated with a second device activity of the one or more device activities.

15. The method of claim 1, wherein the one or more electronically-stored rules define, at least in part, how to:
determine an offset based on the service usage information,
allocate the offset to the first information, and
allocate a negative of the offset to the second information.

16. The method of claim 1, wherein the one or more electronically-stored rules define, at least in part, how to:
determine an offset based on the service usage information,
allocate a first portion of the offset to the first information, and
allocate a second portion of the offset to the second information.

17. The method of claim 1, wherein the one or more electronically-stored rules define, at least in part, how to:
determine an offset based on the service usage information and based on a user behavior,
allocate a first portion of the offset to the first information, and
allocate a second portion of the offset to the second information.

18. The method of claim 17, wherein the user behavior comprises: activation of the end-user device, selection of a data plan for the end-user device, viewing of an advertisement, a content download, an application usage, a website usage, a wireless application protocol (WAP) site usage, a service portal usage, or a purchase.

19. The method of claim 1, wherein the one or more electronically-stored rules assist in implementing a revenue share between the first entity and the second entity, or between the first entity and the operator of the wireless network.

20. The method of claim 1, wherein the one or more electronically-stored rules assist in allocating a fixed fee to the first entity or to the second entity.

21. The method of claim 1, wherein the one or more electronically-stored rules comprise a first rule and a second rule, and wherein generating the first information and the second information comprises:
applying the first rule to determine a first allocation for the first information, and
applying the second rule to determine a second allocation for the second information.

22. The method of claim 21, wherein the second rule defines, at least in part, how to determine the second allocation as a difference between an aggregate service usage and the first allocation.

23. The method of claim 1, wherein the second entity is the user of the end-user device or an entity responsible for paying for the second portion of the usage.

24. The method of claim 1, wherein the second entity is not the user of the end-user device and is not the operator of the wireless network.

25. The method of claim 1, wherein the first entity comprises a device group partner, an original equipment manufacturer (OEM), an ambient service partner, a roaming service partner, a sponsored service partner, a transaction partner, a website partner, a wireless application protocol (WAP) site partner, a portal site partner, an application provider, a content provider, a search provider, a shopping service provider, a streaming service provider, an e-book provider, a voice-over-Internet protocol (VOIP) provider, an e-mail provider, a music service partner, an advertising partner or provider, a partner of a provider of a network service, a service seller, a retailer, a distributor, a service re-seller, a service wholesaler, a service provider, a carrier, a carrier network partner, a mobile virtual network operator (MVNO), or a virtual MVNO.

26. The method of claim 1, further comprising accepting configuration information through an interface, the configuration information identifying the one or more device activities, the one or more electronically-stored rules, or a first device group, the first device group comprising one or more end-user devices including the end-user device, the first device group defined by one or more device credentials or end-user credentials, each of the one or more device credentials or end-user credentials corresponding to a different one of the one or more end-user devices, and wherein at least a subset of the one or more electronically-stored rules is based on the end-user device belonging to the first device group.

27. The method of claim 1, wherein the end-user device belongs to a first device group of a plurality of device groups, the first device group comprising one or more end-user devices including the particular end-user device, the first device group defined by one or more device credentials or end-user credentials, each of the one or more device credentials or end-user credentials corresponding to a different one of the one or more end-user devices, and wherein at least a subset of the one or more electronically-stored rules is based on the particular end-user device belonging to the first device group.

28. The method of claim 27, wherein the first device group is associated with an enterprise.

29. The method of claim 27, wherein the first device group is associated with a device group partner, a mobile virtual network operator (MVNO), a virtual MVNO, an original equipment manufacturer (OEM), an ambient service partner, a roaming service partner, a sponsored service partner, a transaction partner, a website partner, a wireless application protocol (WAP) site partner, a portal site partner, an application provider, a content provider, a search provider, a shopping service provider, a streaming service provider, an e-book provider, a voice-over-Internet protocol (VOIP) provider, an e-mail provider, a music service partner, an advertising partner or provider, a partner of a provider of a network service, a service seller, a service re-seller, a retailer, a distributor, a service wholesaler, a service provider, a carrier, or a carrier network partner.

30. The method of claim 1, wherein the first information and the second information comprise accounting information.

\* \* \* \* \*